United States Patent [19]

Handschy et al.

[11] Patent Number: 4,813,771
[45] Date of Patent: Mar. 21, 1989

[54] ELECTRO-OPTIC SWITCHING DEVICES USING FERROELECTRIC LIQUID CRYSTALS

[75] Inventors: Mark A. Handschy; Noel A. Clark, both of Boulder, Colo.

[73] Assignee: Displaytech Incorporated, Boulder, Colo.

[21] Appl. No.: 108,799

[22] Filed: Oct. 15, 1987

[51] Int. Cl.[4] .............................................. G02F 1/13
[52] U.S. Cl. ................................. 350/350 S; 350/320; 350/347 V
[58] Field of Search ................ 350/347 V, 350 S, 320

[56] References Cited

U.S. PATENT DOCUMENTS

| | | | |
|---|---|---|---|
| 3,796,999 | 3/1974 | Kahn | 350/350 SX |
| 3,989,355 | 11/1976 | Wilmer | 350/335 |
| 4,128,313 | 12/1978 | Cole et al. | 350/349 X |
| 4,201,442 | 5/1980 | McMahon et al. | 350/96.14 |
| 4,252,414 | 2/1981 | Kinugawa et al. | 350/339 R |
| 4,277,144 | 7/1981 | Saurer et al. | 350/349 |
| 4,278,327 | 7/1981 | McMahon et al. | 350/347 V |
| 4,294,516 | 10/1981 | Brooks | 350/335 |
| 4,367,924 | 1/1983 | Clark et al. | 350/350 S |
| 4,385,799 | 5/1983 | Soref | 350/96.13 |
| 4,508,429 | 4/1985 | Nagae et al. | 350/350 S |
| 4,737,014 | 4/1988 | Green | 350/347 V |

FOREIGN PATENT DOCUMENTS 0032362 8/1984 European Pat. Off. .

OTHER PUBLICATIONS

Yoshino et al, "New Electro-Optical Effects in Ferroelectric Liquid Crystals", *Japanese Journal of Applied Physics*, vol. 18, 1979, Supp. 18-1, pp. 427-433.
Iwasaki et al, "Color Switching in Ferroelectric Smectic Liquid Crystals by Electric Field", Jpn. J. Appl. Phys., vol. 18, No. 12, 1979, pp. 2323-2324.
R. B. Meyer, "Ferroelectric Liquid Crystals: A Riview", Mol. Cryst. Liq. Cryst. 1977, vol. 40, pp. 33-48.
Brunet et al, "Defauts dans les Smectiques C Chiraux", Ann. Phys., vol. 3, 1978, pp. 237-247.
R. B. Meyer et al, "Ferroelectric Liquid Crystals", *Le Journal de Physique*, vol. 36, Mar. 1975, pp. L-69-L-71.
Martinot-Lagarde, "Observation of Ferroelectrical Monodomains in the Chiral Smectic C Liquid Crystals", *Le Journal de Physique* Colloq., vol. 37, 1976, pp. C3-129 through C3-132.
Martinot-Lagarde, "Direct Electrical Measurement of the Permanent Polarization of a Ferroelectric Chiral Smectic C Liquid Crystal", *Le Journal de Physique*, vol. 38, Jan. 1977, pp. L-17-L-19.
Takezoe et al, "Birefringence in the Sm A phase and the Disappearance of Helicoidal Structure in the Sm C* Phase Caused by an Electric Field in DOBAMBC", (List continued on next page.)

*Primary Examiner*—Stanley D. Miller
*Assistant Examiner*—Richard Gallivan
*Attorney, Agent, or Firm*—Cushman, Darby & Cushman

[57] ABSTRACT

An electro-optic switching device using ferroelectric liquid crystals to either transmit or reflect the incident light depending upon the molecular orientation of the ferroelectric liquid crystal molecules. An applied voltage causes the ferroelectric molecules to switch from a first state in which the incident light is substantially transmitted to a state in which the incident light is substantially reflected. This is accomplished by effectively changing the refractive index of the ferroelectric liquid crystal in the different states. The ferroelectric liquid crystal is disposed between two dielectric mediums such as glass so as to define a boundary which either causes incident light to change direction or its complex amplitude to change, and the smectic layers of the ferroelectric liquid crystals are oriented such that the incident light is selectively switched to one or more outputs. The molecules are also oriented so as to rotate in a plane perpendicular to the applied field, thereby reducing the switching time between the first and second molecular orientations. In addition, the switching effect may be made operative solely by the presence or absence of light by generating the applied electric field from the incident light.

82 Claims, 12 Drawing Sheets

OTHER PUBLICATIONS

*Japanese Journal of Applied Physics,* vol. 17, No. 7, Jul. 1978, pp. 1219–1224.

Meyer, "Liquid Crystals for Magneticians: Ferroelectric Liquid Crystals", *IEEE Transactions on Magnetics,* vol. MAG-12, No. 6, Nov. 1976, p. 788.

Simova et al., "Coherent Light Diffraction in a Smectic C Liquid Crystal", Molecular Crystals and Liquid Crystals, vol. 42, 1977, pp. 295–305.

Young et al, "Light Scattering Study of two-Dimensional Molecular-Orientation Fluctuations in a Freely Suspended Ferroelectric Liquid-Crystal Film," Physical Review Letters, vol. 40, No. 12, Mar. 1978, pp. 773–776.

Pelzl et al., "Tilt Angle Determination of a Smectic C Phase by Field-Induced Freedericksz Transition and X Ray Investigations", *Molecular Crystals and Liquid Crystals,* vol. 53, No. 3/4, 1979, pp. 295–305.

Anderson, "Optical Applications of Ferroelectrics", *Ferroelectrics,* vol. 7, 1974, pp. 55–63.

Ostrovskii et al, "Ferroelectric Properties of Smectic Liquid Crystals", JETP, vol. 25, No. 2, Jan. 20, 1977, pp. 70–72.

Ostrovski et al, "Linear Electro-Optical Effect in a Ferroelectric Smectic Liquid Crystal", Sov. Phys. Solid State 21(3), Mar. 1979, 537–38.

Anderson, "Ferroelectrics in Optical Memories and Displays: A Critical Appraisal," *IEEE Transactions, Sonics and Ultrasonics,* Su-19, vol. 3, 1972, pp. 69–79.

Hoffmann et al, "Dielectric Study of Ferroelectric Properties and Chiral Smectic C", *Molecular Crystals and Liquid Crystals,* vol. 8, 1977.

K. Kondo et al, Japanese Journal of Applied Physics, vol. 20, pp. 1773–1777, Oct. 1981.

M. Brunet, Le Journal de Physique, vol. 36, pp. 321–324, Mar. 1975.

J. Doucet et al, Le Journal de Physique, vol. 39, pp. 548–553, 1978.

M. Glogarova, Le Journal de Physique, vol. 42, No. 11, pp. 1569–1572, Nov. 1981.

D. Armitage, Journal of Applied Physics, vol. 52, pp. 1294–1300, Mar. 1981.

N. A. Clark, M. A. Handschy & S. T. Lagerwall, Molecular Crystals and Liquid Crystals, vol. 94, pp. 213–234, 1983.

Yoshino et al., "Electrical Properties of Ferroelectric Liquid Crystals", technology reports of Osaka Univ., No. 1378, pp. 427–435, 1977.

Noel A. Clark, "Surface-Stabilized Ferroelectric Liquid Crystal Electro-Optics: New Multistate Structures and Devices", Ferroelectrics, 1984, vol. 59, pp. 25–67.

J. S. Patel and J. W. Goodby, "Alignment of Liquid Crystals Which Exhibit Cholesteric to Smectic C* Phase Transitions", J. Appl. Phys. 59(7), 1 Apr. 1986, pp. 2355–2360.

M. A. Handschy and N. A. Clark, "First-Order Orientation Transitions in Ferroelectric Liquid Crystals", Physical review Letters, vol. 51, No. 6, Aug. 8, 1983, pp. 471–474.

T. Uchica et al, Proceedings of the 1982 International Display Research Conference, SID/IEEE, pp. 166–170, 1982.

R. A. Soref, Optics Letters, vol. 4, No. 5, pp. 155–157, 1979.

R. A. Soref et al, Optics Letters, vol. 5, No. 4, 147–149, 1980.

Terui and Kobayashi, Proceedings of SPIE, vol. 517 Integrated Optical Circuit Engineering, pp. 267–174, 1984.

Richard A. Soref, "Electrooptic 4 X 4 Matrix Switch for Multimode Fiber-optic Systems", Applied Optics, vol. 21, No. 8, 15 Apr. 1982 pp. 1386–1393.

Richard A. Soref, "Liquid Crystal Switching Components", FOC '80 Proc. (Fiber Optic Communications), 21 (1980).

Miles V. Klein, "Optics", John Wiley & Sons, Inc., pp. 596–616.

J.-Z. Xue, Handschy & Clark, "Electrooptic Response During ... Uniform Director Orientation", Ferroelectrics, 1986.

Handschy and Clark, "Structures and Responses of Ferroelectric ... Geometry", Ferroelectrics, 1984, vol. 59, pp. 69–116.

Abstract of Japanese Patent 59-53815(A) Liquid Crystal ... Element.

Abstract of Japanese Patent 58-176623(A) Electrooptic Device.

Abstract of Japanese Patent 58-173714(A) Optical ... Crystal.

Abstract of Japanese Patent 58-173713(A) Polarizing Element.

Abstract of Japanese Patent 58-173718(A) Optical ... Production.

Abstract of Japanese Patent 58-173719(A) Liquid Crystal Display.

(List continued on next page.)

OTHER PUBLICATIONS

Kashnow and C. R. Stein, "Total-Reflection Liquid-Crystal Electrooptic Device", Applied Optics, vol. 12, No. 10, Oct. 1973.

Lagerwall and I. Dahl, "Ferroelectric Liquid Crystals", Mol. Cryst., 1984, vol. 114, pp. 151–187.

J. S. Patel et al, "A Reliable Method of Alignment for Smectic Liquid Crystals", Ferroelectrics, 1984, vol. 59, pp. 137–144.

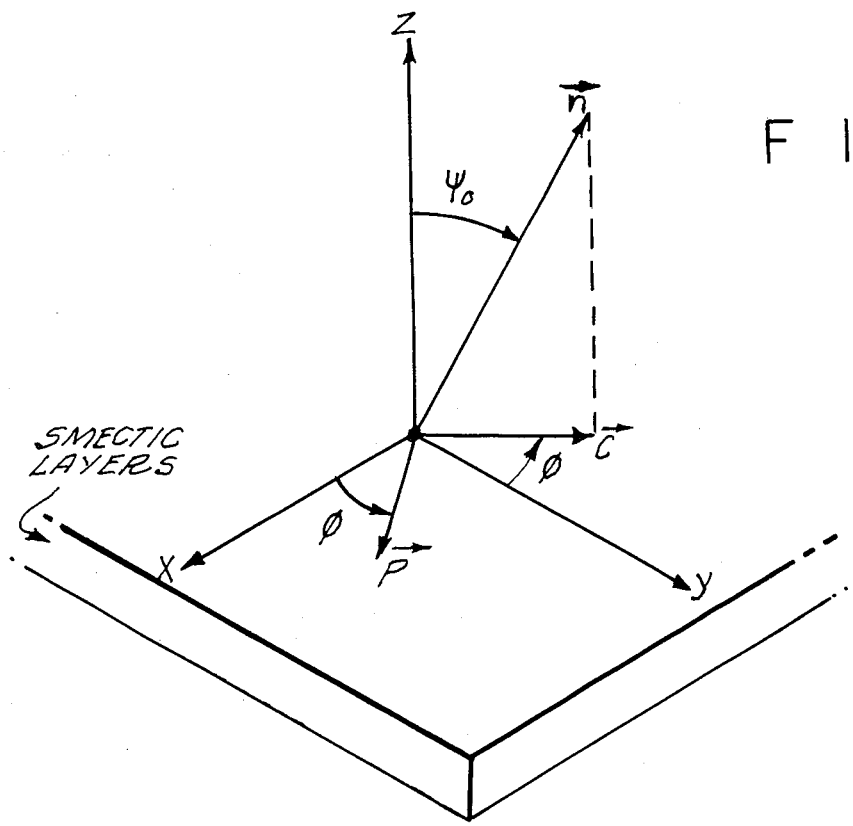
F I G. 1
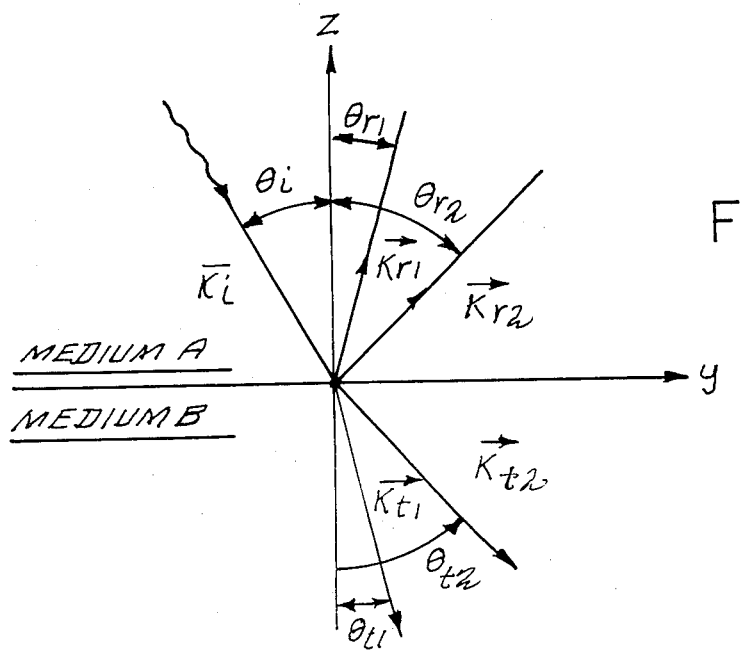
F I G. 2

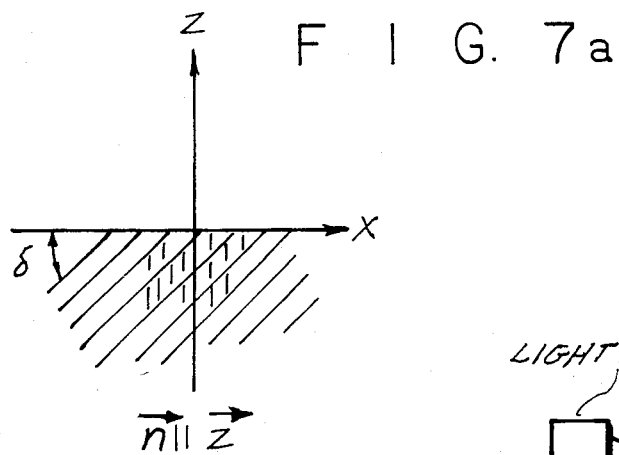
F I G. 7a
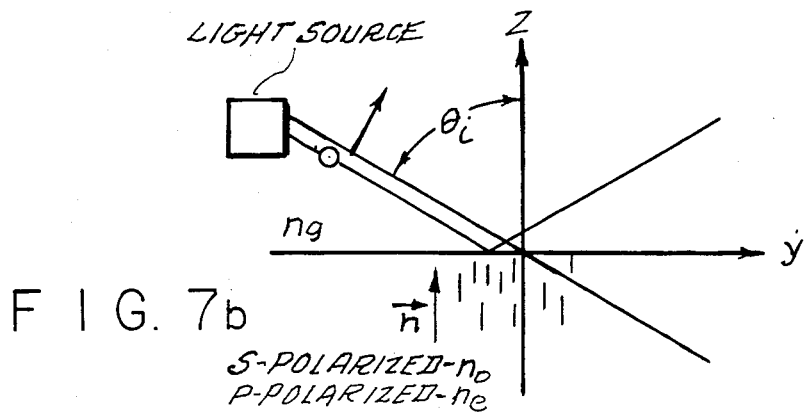
F I G. 7b
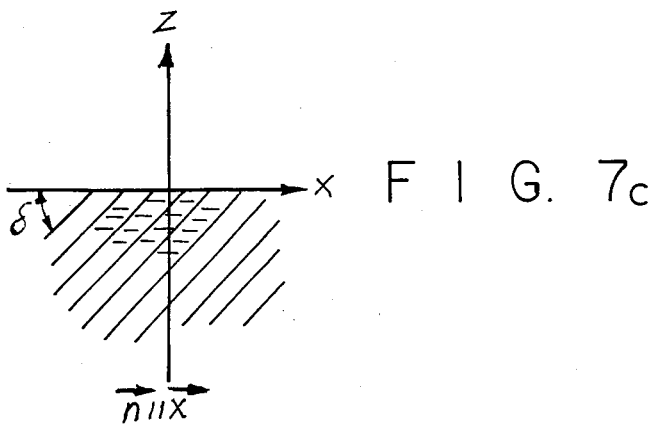
F I G. 7c
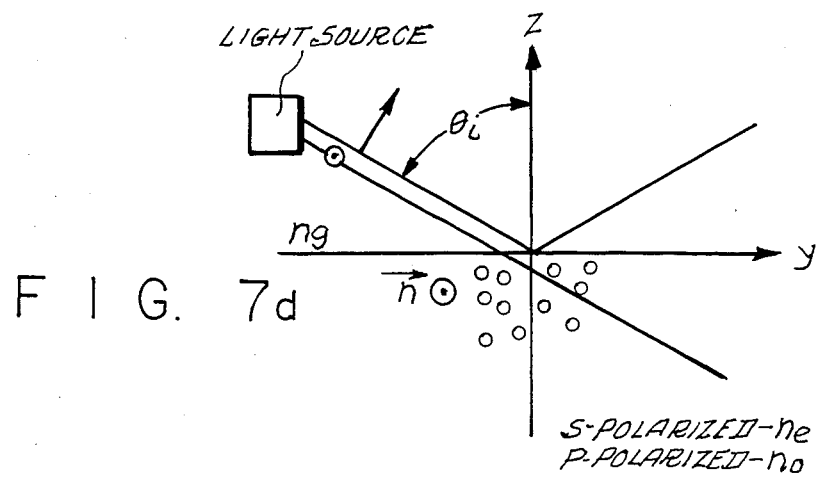
F I G. 7d

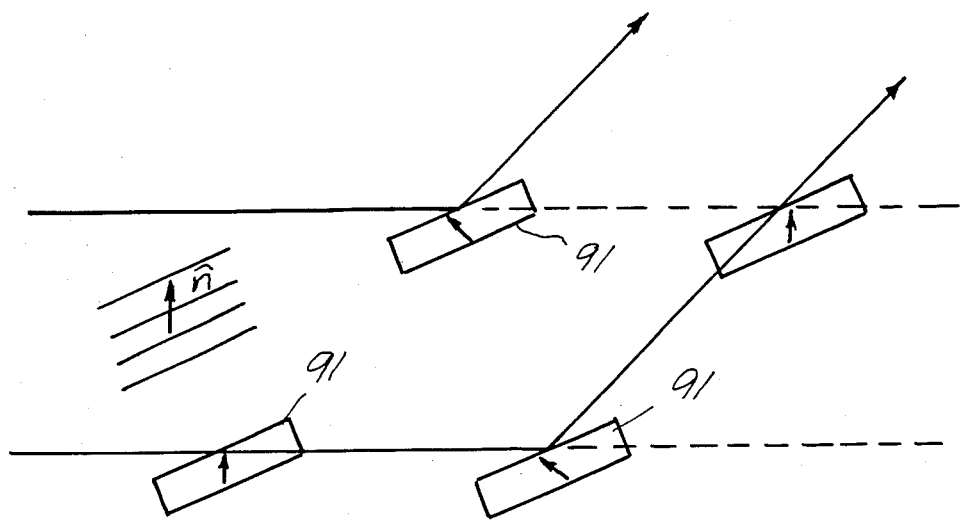
F I G. 10
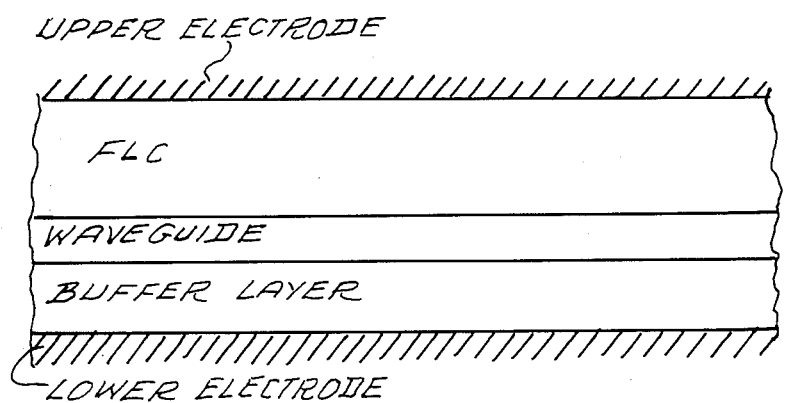
F I G. 11

F I G. 12a
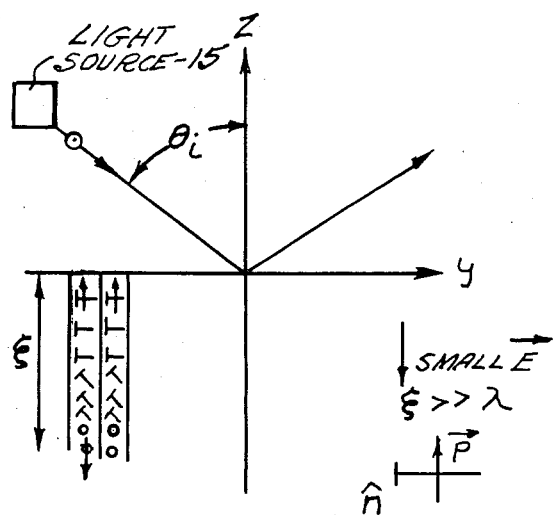
F I G. 12b
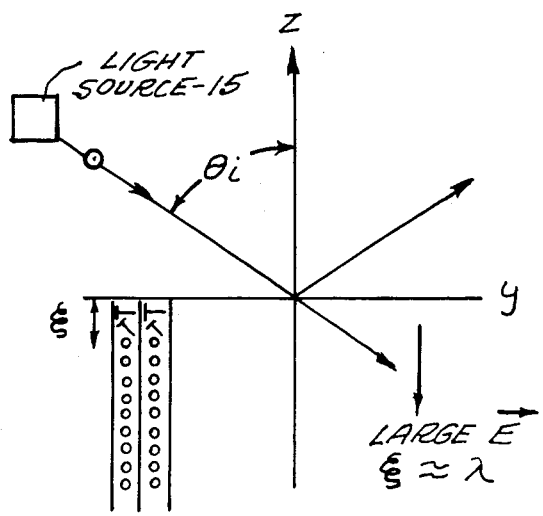
F I G. 13a
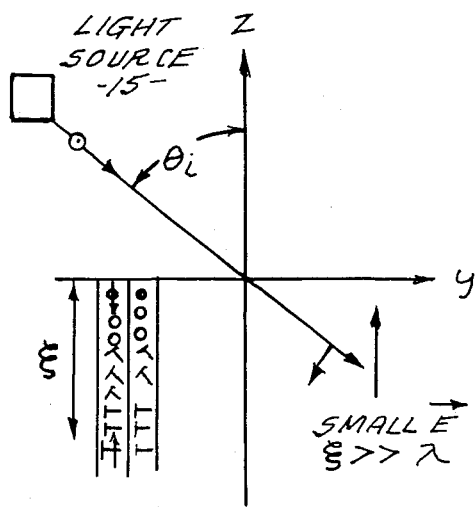
F I G. 13b
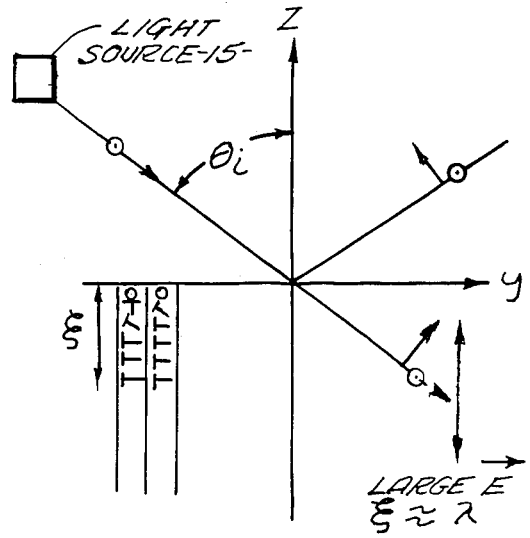

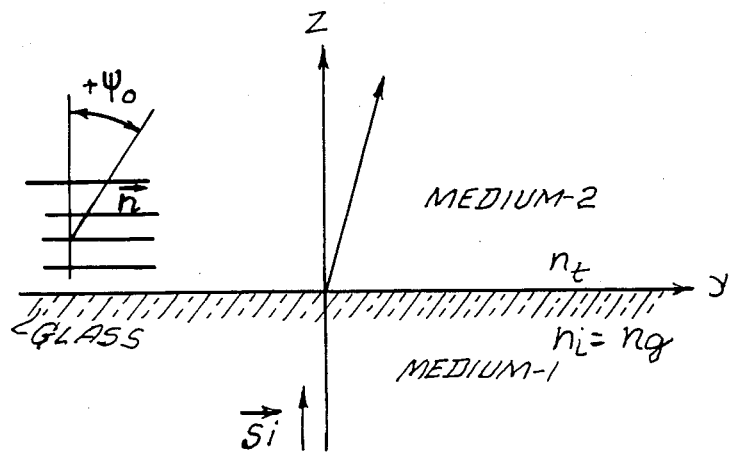
F I G. 14a
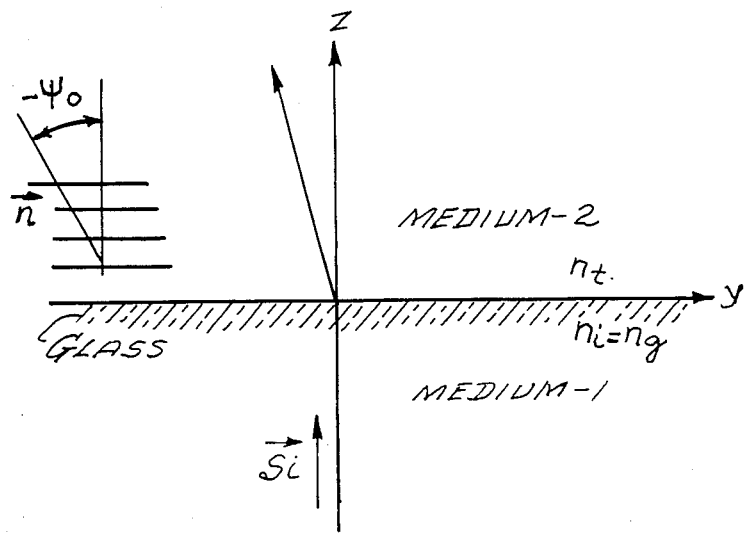
F I G. 14b

ELECTRO-OPTIC SWITCHING DEVICES USING FERROELECTRIC LIQUID CRYSTALS

GOVERNMENT CONTRACT CLAUSE

This invention was made with Government support under contract number F19628-85-C-0087 awarded by the Air Force Systems Command, United States Air Force. The Government has certain rights in this invention.

BACKGROUND OF THE INVENTION

1. Field of Invention

This application relates to liquid crystal electro-optical switching devices and, more particularly, relates to electro-optical switching devices employing ferroelectric liquid crystals.

2. Description of the Prior Art

The manipulation of light (electromagnetic radiation in the infrared, visible, and ultraviolet spectral regions) is becoming an important information handling technology. The construction of integrated optical circuits and the transmission of information along optical fibers are particularly attractive means for exploiting the information carrying capacity of light. A variety of devices, particularly for the generation and detection of intensity modulated light, have been developed for fiber and integrated optic systems. However, the development of complete optical systems has been hindered by the lack of suitable electro-optic (EO) switches for manipulating incident light by the application of electrical signals. Prior art EO switches are made from any material by which the intensity, polarization, or direction of the light can be electrically controlled, but the ease with which the molecular orientation and hence refractive index of liquid crystals (LCs) can be manipulated by applied electric fields has led to the development of liquid crystal electro-optic switching devices which exhibit improved light manipulating characteristics.

These electro-optic switching devices of the prior art have exploited a variety of electrically-induced molecular reorientation effects in nematic and chiral smectic liquid crystal phases, as will be described below.

The electro-optic effects in LCs result from electrical and optical anisotropies of the LC phases which in turn result from molecular ordering. In nematic liquid crystals (hereinafter referred to as nematics), the molecules tend to orient so that their average symmetry axes are parallel to a locally common direction. This direction defines the unit director field $\vec{n}$. (Note that $\vec{n}$ is commonly written herein and in the art as a vector, but since there is no physical significance attached to its sign, that is $\vec{n}$, and $-\vec{n}$, describe the same physical states, $\vec{n}$, can be represented as a line segment.) Besides this orientational order, nematics are much like ordinary liquids. A consequence of this orientational order is anisotropy of the dielectric properties of nematics. Namely, although a linear relationship $\vec{D} = \epsilon \vec{E}$ still exists between the electric and displacement fields within a nematic, the dielectric constant $\epsilon$ is a second rank tensor. This causes the free energy of a nematic in an externally applied electric field to depend on its director orientation. If the director is not otherwise constrained, it will rotate to the orientation that minimizes the nematic's electrical free energy. Since the dielectric anisotropy extends to optical frequencies, this electrically-induced reorientation produces an electro-optic effect that may be exploited in practical light modulation devices.

The usual method for applying electric fields in these devices is to place the LC between closely-spaced parallel electrode plates. In this geometry, voltage applied across the plates produces an electric field perpendicular to the plates. Since the electrostatic energy $$W = \frac{1}{8\pi} \vec{D} \cdot \vec{E} = \frac{1}{8\pi} \vec{E} \cdot \epsilon \vec{E}$$

does not depend on the sign of E, this geometry allows only one field-preferred optical state. This state will have $$\vec{n} \| \vec{E} \text{ if } \Delta\epsilon > 0, \text{ or } \vec{n} \perp \vec{E} \text{ if } \Delta\epsilon < 0,$$

where $$\Delta\epsilon = \epsilon_\| - \epsilon_\perp$$

is the difference between the principal values of $\epsilon$ along axes parallel and perpendicular to $\vec{n}$, respectively.

Since to be useful a device must have more than one optical state, some means must be found to prefer a director orientation other than the one preferred by the field. This is usually accomplished by treating the surface of the electrode plates such that they prefer a different orientation. Then, the applied field produces elastic strain in the orientation of $\vec{n}$. When the electric field is removed, the stress resulting from that strain causes the orientation to relax back to that preferred by the surfaces. This means of operation has several consequences for the dynamic characteristics of such devices. For instance, while the turn-on time of such a device can be made arbitrarily short by increasing the applied electric field strength, the turn-off time is determined solely by geometrical size of the device, and may be undesirably long.

Over the past several years, another class of liquid crystals, ferroelectric liquid crystals (FLCs), has been developed. FLCs have the orientational order characteristic of nematics, as described above, and in addition have their molecules arranged in layers so that their mass density is quasiperiodic in one direction. Layered LC phases are called smectic phases. In smectic LCs (as opposed to ordinary solids) the distribution of the molecules within the layers is somewhat liquid in nature. The prerequisites for ferroelectricity occuring in smectics are that: (1) the constituent molecules must be chiral, in other words not superimposable on their mirror images; and (2) $\vec{n}$ must be tilted from the direction normal to the layer surfaces. When these conditions are met, the LC will have a spontaneous ferroelectric polarization $\vec{P}$ even in the absence of an applied electric field, as pointed out by Meyer et al. in *Le Journal de Physique,* Volume 36, pages L69–71, March, 1975.

The geometrical relationships between the layers of ferroelectric liquid crystals in the chiral tilted smectic phase, $\vec{n}$, and $\vec{P}$ are shown in FIG. 1. In FIG. 1, the smectic layer planes are parallel to the X-Y plane and perpendicular to the z-axis. The director $\vec{n}$ in its preferred orientation tilts away from the z-axis by the angle $\psi_o$. In addition, the projection of $\vec{n}$ onto the layer plane X-Y defines the "c-director" $\vec{c}$, which makes an angle $\phi$ to the y-axis. Finally, the permanent polarization $\vec{P}$ is in the plane of the layers and perpendicular to $\vec{n}$ (i.e., $\vec{P} = P_o \vec{z} \times \vec{n}$), that is, it is perpendicular to $\vec{c}$, making the angle $\phi$ to the x-axis.

The displacement field $\vec{D}$ in FLCs has a dielectric part linearly proportional to $\vec{E}$, similar to that described above in nematics, but in addition has a permanently nonzero part resulting from the spontaneous polarization $\vec{P}$. Thus, the electrostatic free energy of FLCs has a part which is quadratic in E like nematics, and a part linear in E, proportional to $-\vec{P} \cdot \vec{E}$. The FLC seeks to orient its director so as to minimize the total free energy within its thermodynamic constraints, which constraints essentially fix the tilt angle $\psi_o$. Flow involving changes in the direction of the layering is extremely dissipative, however, leaving changes in the azimuthal angle $\phi$ as the principal means available to the FLC to minimize its free energy. The inclusion of a term proportional to $-\vec{P} \cdot \vec{E}$ makes this energy depend on the sign of an applied electric field. Thus, practical devices can be made in the above-mentioned parallel plate geometry where two optically distinct states may be selected by voltages of opposite sign applied to the plates. This allows both the turn-off and turn-on times of such a device to be made shorter by increasing the applied field strength.

The dielectric anisotropy of both nematics and FLCs results in them being optically anisotropic, with the nematics being uniaxial and the FLCs being biaxial, but with refractive indices along the two axes perpendicular to n typically nearly equal, so that for most purposes FLCs are considered to be optically uniaxial, with the optic axis along the director $\vec{n}$ as in nematics. Thus, in either case, electrically induced orientation changes produce changes in refractive index, and these electro-optic effects may be exploited for practical devices, despite the substantial differences in the geometry of the optic axis and applied field directions.

One class of such devices makes use of the change in polarized light passing through an "optically thick" slab of LC material. By "optically thick" is meant that $\Delta nd$ is comparable or larger than $\lambda$, where $\Delta n$ is the LC refractive index anisotropy (birefringence), d is the slab thickness, and $\lambda$ is the light's vacuum wavelength. The twisted nematic, supertwisted birefringence effect, nematic $\pi$-cell, and variable birefringence nematic devices all fall in this class, as does the family of surface-stabilized FLC (SSFLC) devices proposed by N. Clark and S. Lagerwall in U.S. application Ser. No. 511,733, now U.S. Pat. No. 4,563,059, and U.S. application Ser. No. 797,021. These devices operate best when the light they are modulating is incident in a direction near to the normal of the slab. Typically, such a device is placed between a crossed polarizer and analyzer, and it operates so that in one state the transmitted output light is greatly attenuated in intensity by being mostly if not completely absorbed in the analyzer, whereas in the other state the output light is transmitted with as much of the incident intensity as is practical. In neither state does the direction of the incident light propagation change upon crossing the LC layer. Of course, variations are possible where reflective materials are incorporated into such devices such that the incident light is returned toward its source after two passes through the LC slab, but the basic action is still as described above.

Another class of such devices relies on the reflection and refraction properties of light at an interface between two dissimilar dielectrics, one of which is an LC. Examples in the prior art of this class of devices using nematic LCs are disclosed in U.S. Pat. Nos. 4,201,442 and 4,278,327 by D. H. McMahon and R. A. Soref and U.S. Pat. No. 4,385,799 to Soref. Also, as taught by Kashnow and Stein in *Applied Optics*, Vol. 12, No. 10, October, 1973, electrooptic effects have been achieved by placing a thin nematic liquid crystal layer between two glass prisms of appropriate refractive index. For a range of angles of incidence of light on the prism-liquid crystal interface, the light is partially transmitted or totally reflected, depending upon the electric field controlled orientation of the optic axis in the nematic layer. Furthermore, as disclosed by Terui and Kobayashi in *Proceedings of the SPIE*, Vol. 517, p. 267 (1984), the light need not propagate through the FLC medium itself for this type of switching to work, for the same total internal reflection phenomena is obtained where the LC material merely forms the "cladding" for a waveguide of some higher index material. These inventions thus relate to electro-optic devices for switching input light more or less completely between two or more outputs. They separate the outputs by changing the direction of the input light by reflection at an interface between a nematic LC and another dielectric. Consequently, they teach that by selectively applying electric fields to the nematic LC, the direction of the output light may be selected.

SUMMARY OF THE INVENTION

In this application, new ferroelectric liquid crystal devices of the general type outlined above are described which differ from the SSFLC and similar devices in that the causative electrooptical effects occur at the interface between the FLC and another dielectric material and that the length of the optical path through the FLC is not of primary importance.

According to the present invention, first and second dielectrics define a boundary, where at least one of the dielectrics is FLC material. Electric fields applied to the FLC can switch the FLC between different orientations. Light is then directed toward the boundary in such a way that the manner in which it interacts with the boundary is dependent upon the orientation of the FLC.

The devices of the present invention are divided into two categories, based on whether they function principally by effecting changes in the complex amplitudes of the reflected and refracted rays or by changing the direction of the refracted rays.

A first embodiment of an amplitude changing device contains a dielectric-FLC interface in which the FLC's index of refraction at the interface is changed by reorienting the molecules within the smectic layers of the FLC. A voltage pulse is supplied to select one of the states such that either the reflected or refracted intensity produced by the FLC has a large ratio to the similar intensity produced by another FLC state selected by a different applied voltage pulse. Thus, a switch can be made similar to the nematic liquid crystal switching devices of the prior art except that ferroelectric liquid crystals are used so as to take advantage of their more rapid switching capabilities and intrinsic "memory".

By preparing the smectic layers at a certain angle to the interface between the dielectric and the FLC, an embodiment of an amplitude changing device may be produced which has optical states similar to those in the nematic devices of U.S. Pat. Nos. 4,201,442, 4,278,327, and 4,385,799 noted in the Background of the Invention. In other words, the applied field selects either a first state with $\vec{n}$ perpendicular to the interface, wherein incident light of a first polarization sees the refractive index $n_e$ while light of another polarization sees refractive index $n_o$, or a second state with $\vec{n}$ parallel to the interface and perpendicular to the plane of incidence, wherein the light is affected in a manner opposite to that in the first state. Due to the geometry of the ferroelectric liquid crystal, however, the electric field applied to the FLC must be applied parallel to the interface, whereas in the nematic devices of the prior art the electric field is applied parallel to the normal to the plane.

In a second embodiment of an amplitude changing device, an interface may be formed between two differently oriented FLC regions. In this arrangement, appropriately polarized light sees different indices of refraction on either side of the interface depending upon the orientation of the FLC molecules. This configuration may be used to form a switch in which light propagating through the FLC slab is either transmitted across the boundary between the regions or is totally internally reflected at the boundary depending upon the field-selected director states of the two regions. In addition, this type of switching may work if the FLC material merely forms the cladding for a waveguide of a higher index material, wherein the index of refraction of the cladding can be changed with applied voltage pulses so as to change the optical path of the light propagating through the waveguide.

In a third embodiment of an amplitude changing device, the FLC exhibits an inhomogeneous director configuration. Namely, if the FLC's interaction with the interface prefers an orientation that presents a first refractive index to incident light, when an electric field is applied that prefers a different director orientation it is possible that the director orientation will vary from that preferred by the interface in the region immediately adjacent to the interface to that preferred by the applied field some distance away from the interface, giving that region a second refractive index. When the interface-preferred orientation is one with low refractive index, the portion of light transmitted across the interface can be continuously increased by increasing the applied electric field strength. When the interface has a preferred molecular orientation that gives large refractive index to appropriately polarized incident light, on the other hand, at a low applied field that light will be initially transmitted. However, as the light propagates through the FLC, the FLC's director orientation gradually changes, and the polarization of the transmitted light nearly follows along with $\vec{n}$. When the electric field strength is increased, the distance over which the director reorientation takes place is shortened, and the above "following along" no longer occurs, allowing the transmitted intensity to be continuously reduced.

The FLC optical switching device of the present invention also performs switching functions by causing electrically-induced changes in the molecular orientation so as to change the propagation direction of the transmitted light. Appropriately polarized light is refracted at the interface in different directions which depend on which FLC molecular orientation has been selected by applied electric fields.

The switching function of the present invention may also be controlled solely by light such that an external electrical power source is not necessary. The presence of light is sensed by a photovoltaic device, and an output voltage is generated which is sufficient to drive the switching of the optical switch.

It was previously envisioned that the selective reflection properties of liquid crystals of other "textures" of the liquid crystal slab (such as twisted, homeotropic, scattering, etc.) and possibly other mesophases (cholestic or smectic) could be used for electro-optic switching by Soref in his article entitled "Liquid Crystal Switching Components," *Fiber Optic Communications*, Vol. 21, 1980, pp. 1–5; however, FLCs of the type disclosed herein have not been used previously in electro-optic switching devices. Due to the substantial geometrical differences between the nematic and smectic liquid crystals, the same switching technique used for nematic crystals as disclosed by Soref cannot be used for smectic liquid crystals. These geometric differences are particularly important, for the improved switching characteristics of the FLCs over the nematic LCs are an unexpected advance in the art of electro-optic switching.

The devices of the type used in the present invention differ from those of the above-mentioned prior art in several ways. First, although the present invention uses FLCs, the present invention differs from the family of FLC devices previously proposed by Clark and Lagerwall, for in the Clark-Lagerwall devices noted above, a beam or ray of polarized light is transmitted through an optically thick slab of FLC, and emerges propagating in approximately the same direction as its incident direction. By applying electric fields to the FLC slab, the intensity of the polarization components of the transmitted light beam can be varied. These variations can then be used to effect changes in the total intensity of the beam by passing it through a polarization analyzer. In contrast, in the devices of the present invention, a beam of light is incident on an interface between an FLC and another dielectric, where it is reflected and refracted. By applying electric fields to the FLC, either the relative intensities of the reflected and refracted beams can be changed, or the direction of propagation of the refracted beam can be changed.

Second, although the present invention relies on the effect on light of an interface between an LC and another dielectric, they differ from those devices where the LC is a nematic. In those devices using nematics, an electric field $\vec{E}$ applied across the nematic slab produces a rotation of the director about an axis perpendicular to itself and the electric field. Since the electrically induced torque does not depend on the sign of $\vec{E}$, only one electrically-selected director orientation is possible, that is, one with $\vec{n}$ parallel to $\vec{E}$ for $\Delta\epsilon > 0$ and that with $\vec{n}$ perpendicular to $\vec{E}$ for $\Delta\epsilon < 0$. A device with more than one state must then use some other effect, usually surface forces, to favor some other director orientation. In the devices of the present invention, however, the geometry is quite different, reflecting the different underlying symmetry of the FLC. The director reorientation is on a cone of angle $\psi_o$ whose axis is normal to the smectic layer planes, the so-called "tilt-cone." Applied electric fields produce changes in the azimuth of the director on this cone, and in general, the field-preferred orientation has $\vec{P}$ parallel to the component of $\vec{E}$ that lies parallel to the layer plane.

Although more general configurations are within the scope of this invention as will be described below, a simple example serves to illustrate the differences between FLC and nematic LC dielectric interface devices. If the smectic layers are oriented normal to the surface of the FLC slab, for example, an electric field $\vec{E}$ applied across the slab will prefer according to its sign one of two director orientations, both parallel to the slab surface, but differing in orientation by $2\psi_o$. Thus, the effective rotation is about an axis perpendicular to $\vec{n}$ but parallel to $\vec{E}$, with two field-preferred director orientations, both perpendicular to $\vec{E}$.

These differences between the devices of the present invention and those of the prior art result in many significant advantages for the devices of the present invention. They offer the ability to change the intensity or direction of a light beam without the use of a light absorbing polarizer or analyzer. They work equally well with input light of different wavelengths. Further, they can switch input light between two or more outputs on the basis of light beam propagation direction, which is advantageous in many applications. Finally, by having a stronger, sign-dependent coupling to applied electric fields, they overcome the disadvantageous slow response times of nematics, particularly in response to the removal of the applied field.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 1 is a schematic representation of the geometry of the smectic C* liquid crystal material;

FIG. 2 is a schematic representation of the general geometry of reflection and refraction at an interface between anisotropic media;

FIGS. 7a-7d are schematic representations of a dielectric-FLC interface with smectic layers at an angle $\delta$ to the interface such that in a first state the molecules are oriented parallel to the normal to the interface and such that in a second state the molecules are parallel to the interface;

FIG. 10 is a schematic representation of a matrix switch with a plurality of the FLC-FLC interfaces shown with reference to FIG. 9 arranged such that incoming light may be selectively routed to one of a plurality of optical outputs;

FIG. 11 is a schematic representation of a waveguide switch utilizing the FLC-FLC interface shown with reference to FIG. 9;

FIGS. 12a and 12b are schematic representations of a dielectric-FLC interface with a smectic layer orientation as in FIG. 3 but exhibiting an inhomogeneous FLC orientation such that transmitted and reflected light intensities may be controlled in a continuous method;

FIGS. 13a and 13b are schematic representations of a dielectric-FLC interface as in FIG. 12 but with a different preferred molecular orientation at the surface in which incident light is transmitted across the interface and follows the director orientation in the absence of a strong applied field;

FIGS. 14a and 14b are schematic representations of a dielectric-FLC interface employing a direction changing feature in which incident light is refracted in two different directions by the two different director orientations selected by applying opposite fields parallel to the x-axis;

DETAILED DESCRIPTION OF THE PREFERRED EMBODIMENTS

Figure 3A:
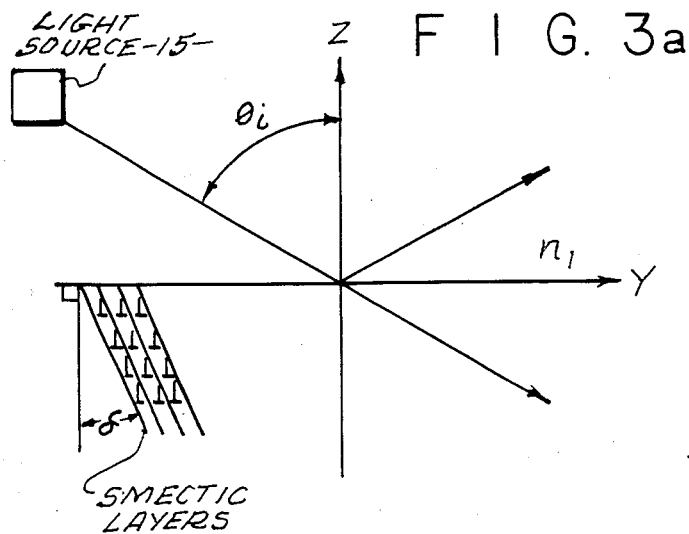
FIGS. 3a-3d are schematic representations of an FLC dielectric interface with director states presenting low and high refractive indices to polarized incident light.

FIG. 2 shows a ray of light with wave vector $\vec{k}_i$ incident on the interface between two anisotropic materials, medium A and medium B. The incident light wave vector $\vec{k}_i$ makes an angle $\Theta_i$ with a normal to the interface and forms two reflected rays with wave vectors $\vec{k}_{r1}$ and $\vec{k}_{r2}$ at angles $\Theta_{r1}$ and $\Theta_{r2}$ to the normal, respectively. Incident light also forms two refracted rays with wave vectors $\vec{k}_{t1}$ and $\vec{k}_{t2}$, at angles $\Theta_{t1}$ and $\Theta_{t2}$ to the normal to the interface, respectively. The complex amplitude (intensity and polarization state), direction, and phase of the rays depend on the refractive indices of mediums A and B. The present invention uses these properties to make practical light switching devices by allowing light to be incident on the interface between the region filled with one dielectric material (either an FLC or some other material) and a region filled with FLC. Then, almost any change in the FLC's molecular orientation immediately adjacent to the interface will produce changes in its reflection and refraction properties. Methods for producing such molecular reorientations in FLCs by applying electric fields that change in strength and direction to the region that contains the FLC are known in the art; for example, a multitude of molecular orientation states that can be produced and stabilized between parallel plates are disclosed in U.S. Pat. Nos. 4,367,924 and 4,563,059 to N. Clark and S. Lagerwall. However, the present invention operates much faster than the nematic switching devices of the prior art. Furthermore, the present invention can be arranged more advantageously than surface stabilized ferroelectric liquid crystal switching devices as described above.

The devices of the present invention are divided into two categories, based on whether they function principally by effecting changes in the amplitudes of the reflected and refracted rays or by changing the direction of the refracted rays. Each of these devices and their corresponding geometries will be discussed in Section I below, and then, the method of constructing the presently preferred embodiment incorporating the switching geometries discussed in Section I will be described in Section II.

I. FLC GEOMETRIC ORIENTATION FOR EO DEVICES

A. Amplitude Changing Devices

The amplitude changing devices of the present invention are of two types: those in which applied voltage steps and pulses select between discrete, different molecular orientation states, and those in which continuous changes in the applied field produce continuous changes in the molecular orientation. Devices of the first type have more than one discrete light amplitude state, each being associated with a discrete director orientation state. The differences between the director orientations of the different states persist to within a distance from the interface which is small compared to the light's wavelength. Devices of the second type, on the other hand, have a continuum of amplitude states arising from continuously varying director states produced by continuously varying applied electric field strength. The greatest rate of light amplitude change in these devices is produced when the director changes from a surface-favored orientation immediately adjacent to the interface to a field-favored orientation over a length comparable to the light's wavelength. Each of these devices exhibits characteristic features which are advantageous for selected functions as will be described below.

1. Discrete-state devices a. Dielectric-FLC Interface With Electric Fields Applied Perpendicular to the Interface In general, any molecular orientation change in an FLC will produce some changes in the intensities of light rays reflected and refracted at the interface between the FLC and another dielectric material; however, the present invention is directed to those configurations where either the reflected or the refracted intensity produced by the FLC molecular orientation selected by an applied voltage has a large ratio compared to the similar intensity produced by the FLC states selected by a different applied voltage. In fact, a virtually infinite ratio of intensities can be achieved by exploiting the phenomenon of "total internal reflection" in which a ray of light propagating through a medium of larger refractive index and incident on an interface with a medium of lesser refractive index is totally reflected. This occurs when the angle of incidence is increased beyond the critical angle, that angle at which either the refracted ray or its wavefront normal is parallel to the interface. Thus, for angles of incidence larger than this critical angle the incident ray is entirely reflected, and the refracted intensity is zero.

FIGS. 3a–3d show a first embodiment in which a ray of light from a light source 15 (which may be freely propagating or confined to an optical fiber guide or other type of waveguide) incident through a dielectric medium of a first refractive index $n_1$ strikes the interface with a region containing FLC material. The coordinate system is chosen such that the z-axis is perpendicular to the interface defined by the X-Y plane, the x-axis is perpendicular to the plane of incidence, and the y-axis is perpendicular to both the x and z axes.

In this embodiment, the smectic layers of the FLC are oriented so that their intersections with the plane of the interface (the X-Y plane) make an angle $\alpha$ to the y-axis and are tilted away from being normal to the interface by an angle $\delta$. Different director orientations can be selected by applying an electric field $\vec{E}$ of the appropriate direction and sign. For instance, an electric field perpendicular to the interface can be applied by applying a voltage across a transparent electrically conducting coating on the face of the first dielectric medium and an electrically conducting plate that bounds the FLC region parallel to the above-mentioned interface. (A more detailed structure of the FLC and the electrodes will be given below with reference to FIG. 17.) The preferred director orientation has its $\vec{P}$ parallel to that component of the applied field $\vec{E}$ that is parallel to the layers, and reversing the applied voltage changes the sign of $\vec{E}$ such that it prefers a director orientation at an angle $2\psi_o$ with respect to the other orientation.

Whichever orientation is preferred will persist at least to within a length $\xi$ of the interface, where $\xi$ is the length that characterizes the size of a distortion whose elastic energy density $K/\xi^2$ is equal to the electrostatic energy density PE ($\xi = [K/PE]^{\frac{1}{2}}$). For strong applied fields $E >> K/(P\lambda)^2$, this distance will be small compared to the light wavelength $\lambda$ and will have substantially no effect on the device operation. Selection of other director orientations besides the field-preferred ones are possible through the mechanisms of surface stabilization disclosed by Clark and Lagerwall in U.S. Pat. Nos. 4,367,924 and 4,563,059. As they disclose, in the absence of strong applied fields, up to four distinct director orientations may be stabilized by the FLC's interaction with the surface, and switching between these director orientation states may be accomplished by stronger electric fields applied normal to the surface for limited times. Thus, there exists the possibility for six field-selected director orientation states near the interface: the two states preferred by strong fields applied normal to the interface but oppositely directed, and the four surface-stabilized states that can be switched between by the applied field pulses as disclosed by Clark and Lagerwall.

In general, linearly polarized light incident from the first dielectric on its interface with the FLC of a given director orientation will be partially reflected and partially transmitted. The partially transmitted light will, in general, consist of two rays, the ordinary and the extraordinary rays. If the first medium is an isotropic dielectric, the partially reflected light will consist of only one ray, although, in general, it will now be elliptically polarized. If the first medium is also anisotropic, however, the partially reflected light will, in general, consist of two rays, one ordinary and one extraordinary. The ellipticity of the reflected ray (in the case where the first medium is isotropic) and the amplitudes and intensities of all the reflected and transmitted rays (whether the first medium is isotropic or anisotropic) will differ between the various director states selected by applied electric fields normal to the interface.

If, however, the angle of incidence $\theta_i$ is larger than the critical angle $\theta_c$ for the transmitted ordinary ray, the only transmitted ray will be the extraordinary one. This, rather than the reverse, is the case possible for FLCs since they have an extraordinary refractive index $n_e$ greater than an ordinary refractive index $n_o$ so that the refractive index seen by the extraordinary ray is always greater than the refractive index seen by the ordinary ray which is identically $n_o$. The refractive index seen by the extraordinary ray, however, depends on its orientation relative to the optic axis or director of the FLC. The closer its wave propagation direction (the direction normal to its wavefronts) is to the FLC's optical axis, the more nearly the refractive index seen by the extraordinary ray approaches $n_o$. This relative propagation direction will, in general, be different for the various field-selected director states, thereby implying that the extraordinary transmitted ray sees a different refractive index for these states. Thus, the refractive index $n_1$ of the first medium and the angle of incidence can be further arranged, without losing the property of not transmitting the ordinary ray, to transmit an extraordinary ray in one of the director states and to totally internally reflect all the incident light for another director state. Thus, voltages applied across the two above-mentioned electrodes bounding the FLC medium can select between two director states, one with the director orientation for which the extraordinary transmitted ray sees a higher refractive index and in which some light is transmitted across the interface (the "transmitting state"), as shown in FIG. 3a, and one with the director orientation more nearly parallel to the y-axis giving a lower refractive index so that all the incident light is reflected and none is transmitted (the "reflecting state"), as shown in FIG. 3c. Consequently, a switching effect can be achieved similar to that using nematic LCs as disclosed by R. A. Kashnow and C. R. Stein in *Applied Optics*, Volume 10, pages 2309-2311, October, 1973 and in U.S. Pat. Nos. 4,278,327 to McMahon and Soref and 4,385,799 to Soref.

Achieving the largest possible refractive index change between the director orientations of the transmitting state and the reflecting state allows the largest angle of incidence while at the same time making the operation of the device least sensitive to changes in the angle of incidence. Large refractive index changes are obtained by using FLC materials with large birefringences ($\Delta n$'s) and large tilt angles ($\psi_o$'s), and orienting the smectic layers to have small tilts ($\delta$'s). For the special case of $\delta=0$, the field-preferred director states will be parallel to the interface, allowing incident light polarized perpendicular to the plane of incidence (hereinafter referred to as s-polarized) to be affected by the full extraordinary index $n_e$ for one of the field-preferred director states obtained when $\alpha=\psi_o$. The refractive index seen by s-polarized incident light for the other field-preferred director state is made smaller the larger $\psi_o$ is, reaching a minimum value of $n_o$ when $\psi_o=45°$.

Figure 4A:
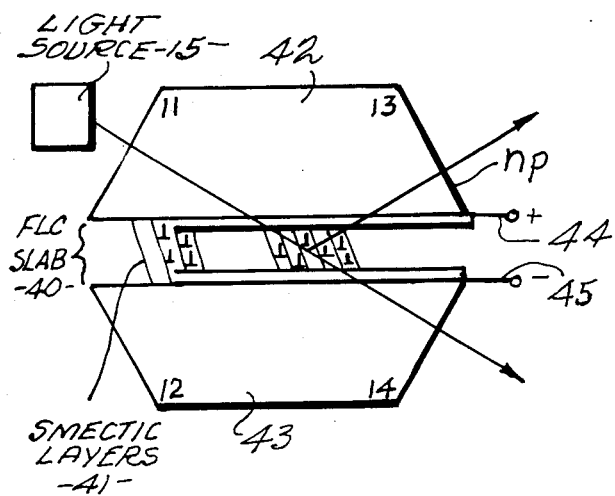
FIGS. 4a-4d are schematic representations of a single-pass FLC switch in which the FLC is a thin slab between two glass prisms.
Figure 4B:
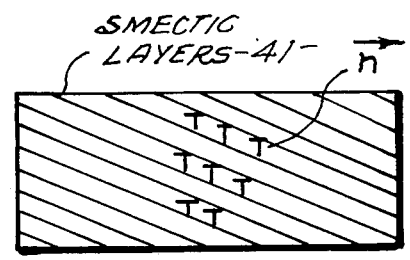

A schematic diagram of an embodiment of a single-pass switch using ferroelectric liquid crystals of the smectic phase is shown in FIGS. 4a–4d. The switch is formed by a thin slab of an FLC material 40 containing smectic layers 41 between two glass prisms 42 and 43 with transparent electrically conductive coatings 44 and 45 on their respective faces. Voltages pulses are applied to these coatings to select between the different possible director orientations. The orientation of the layers, the angle of incidence, and the refractive index $n_p$ of the prisms are arranged so that for the director state selected in FIG. 4c a light ray incident from source 15 on port 11 of prism 42 sees, regardless of its polarization state, a refractive index less than $n_p \sin \theta_i$ at the FLC interface, and is therefore totally internally reflected to exit out port 13 of prism 42. However, when another director state is selected, as shown in FIG. 4a, the polarization component of a ray incident through port 11 that excites the extraordinary mode of propagation in the FLC will no longer be totally internally reflected since it sees a refractive index large enough (i.e. $>n_p \sin \theta_i$) to make the angle of incidence smaller than the critical angle. Thus, part of this ray is transmitted across the FLC slab and exits through port 14 of prism 43, while the other part is reflected and exits through port 13 of prism 42 as before. The portion of the incident light that is transmitted in this state can be maximized by matching the refractive index seen by the extraordinary ray in the FLC to the refractive index seen in the prism by the ray that excites the extraordinary ray in the FLC by suitable choice of the prisms' material. Any of the four ports 11, 12, 13 and 14 may be used as the incident port for the light ray, and more than one may be used simultaneously.

Figure 4C:
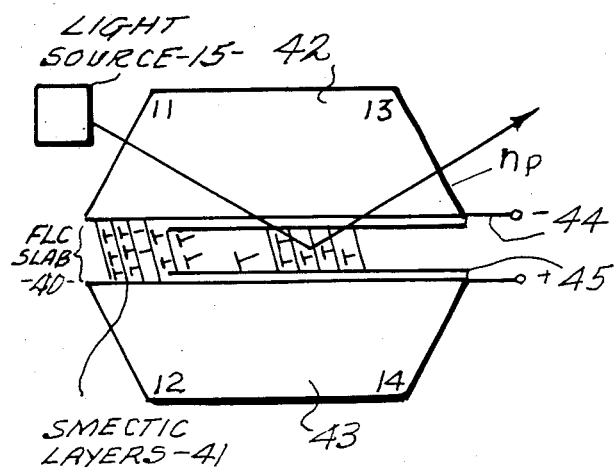
Figure 4D:
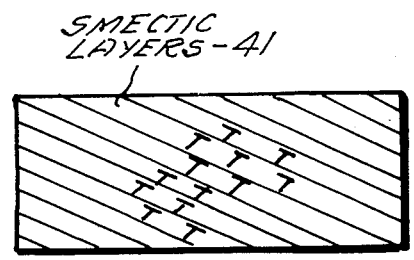

When the above-mentioned refractive index matching condition is satisfied, the embodiment of FIGS. 4c and 4d acts as a polarizing beam splitter, substantially completely separating out the two orthogonal linear polarization components that make up an incident light ray of arbitrary polarization state by transmitting the one that excites the extraordinary mode while reflecting the other. This property enables further novel and useful light switching embodiments. For example, if the light output from a single-pass FLC switch as shown in FIGS. 4a–4d is redirected to be incident on another similar switch, an optical switch results that will completely switch unpolarized input light. An embodiment of such a switch using FLCs is shown in FIGS. 5a and 5b.

Figure 5A:
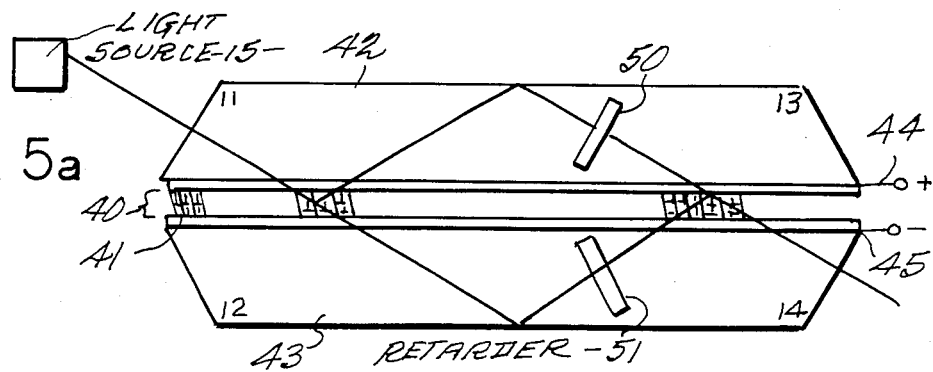
FIGS. 5a and 5b are schematic representations of a double-pass FLC switch which is insensitive to the polarization of the incoming light.
Figure 5B:
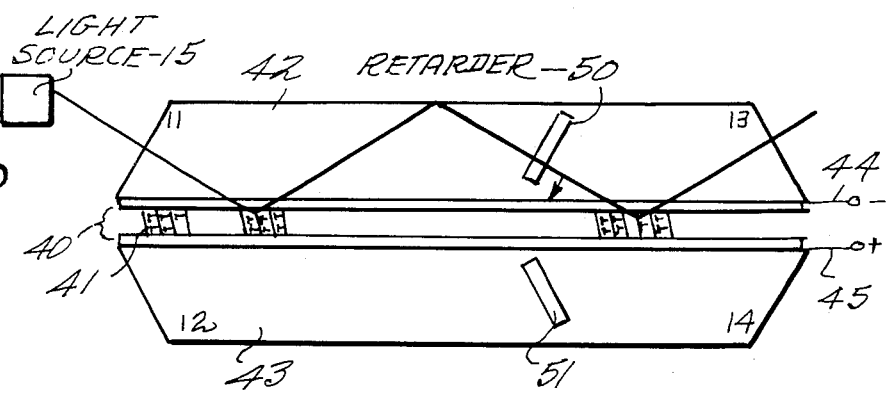

FIGS. 5a and 5b show an embodiment of a double-pass FLC switch combining two of the elements of FIG. 4 with retarders 50 and 51 so as to make the switch substantially insensitive to the polarization of the incident light. The switch in FIGS. 5a and 5b is also formed by a thin slab 40 of FLC material between two prisms 42 and 43, and the configuration of the FLC-glass interface is the same as described above with reference to FIGS. 4a–4d. Since the switch described above with reference to FIGS. 4a–4d can only switch that polarization of the incident light that excites the extraordinary mode of propagation in the FLC, however, the switching device of FIGS. 5a and 5b employs retarders 50 and 51 which change the polarization state of polarized light passing through them. These retarders may be plates of a birefringent material (waveplates) or may operate by use of the retardation experienced by a light ray upon total internal reflection as is exploited in a device known in the art as the Fresnel rhomb.

FIG. 5a shows such a switch when the applied voltage has selected the FLC state in which the component of the incident light that excites the extraordinary mode is substantially totally transmitted. An unpolarized input ray from light source 15 comprised of two orthogonally polarized components enters through port 11 and strikes the prism-FLC interface at an angle of incidence greater than $\theta_c$ for the component that excites the ordinary mode in the FLC. This polarization component of the incident ray is thus totally internally reflected and stays within the same prism 42. The other component, on the other hand, is transmitted without substantial reflection through the FLC region 40 into the other prism 43 since it sees the same refractive index in the prism and in the FLC. Both light components are then totally internally reflected at the air-glass interface, and are directed back from opposite sides towards the FLC-prism interface. Each light component then passes through a retarder (either 50 or 51). Retarder 50 converts the polarization of the reflected light into the state that excites the extraordinary mode in the FLC so that on its next pass towards the FLC prism interface it is substantially totally transmitted, while retarder 51 converts the polarization of the transmitted extraordinary light into the state that will be totally internally reflected at the FLC-prism interface. In this manner, the two components are recombined to travel through the second glass prism 42 and exit through port 14.

FIG. 5b shows the double-pass FLC switch when the applied voltage has selected another molecular orientation. As shown, both light components are totally internally reflected at the FLC-glass interface and propagate within the first glass region 42. Both components are again reflected at the glass-air interface and pass together through the retarder 50. Both components continue to propagate towards the FLC-glass interface where they are both again totally internally reflected, and then they propagate back through the glass prism 42 to exit through incident port 13.

The switch shown in FIGS. 5a and 5b may also be used as a 4-port device having two states. For this purpose, incident light may be applied through a second incident port such as port 12 of the second glass region 43 at the same angle of incidence as the light applied to incident port 11 of the first glass region 42. When the FLC molecules are oriented such that unit director $\vec{n}$ is further from the y-axis, both components of the light incident at port 11 exit together through the opposite port 14, and both components of the light incident on the port 12 exit together through the opposite port 13. When the unit director $\vec{n}$ of the FLC is closer to the y-axis, on the other hand, both components of the incident light stay in the glass region from which they were incident. Thus, light incident on port 11 exits through port 13, and light incident on port 12 exits through port 14. Consequently, this optical switch defines a 4-port device with two states, one state in which port 11 is optically connected to port 13 and port 12 is optically connected to port 14, and another state where ports 11 and 14 and 12 and 13 are respectively connected to each other.

The optical switching device of FIGS. 5a and 5b thus function as a versatile optical routing switch in which an input beam may be connected to one of two voltage-selected outputs. In addition, when the switch is in the transmitting state, by choosing the retardation of the retarders 50 and 51 to be different from that specified above, light incident at port 11 can exit at both ports 13 and 14 in a ratio of intensities which is determined by the retardation of the retarders.

Figure 6:
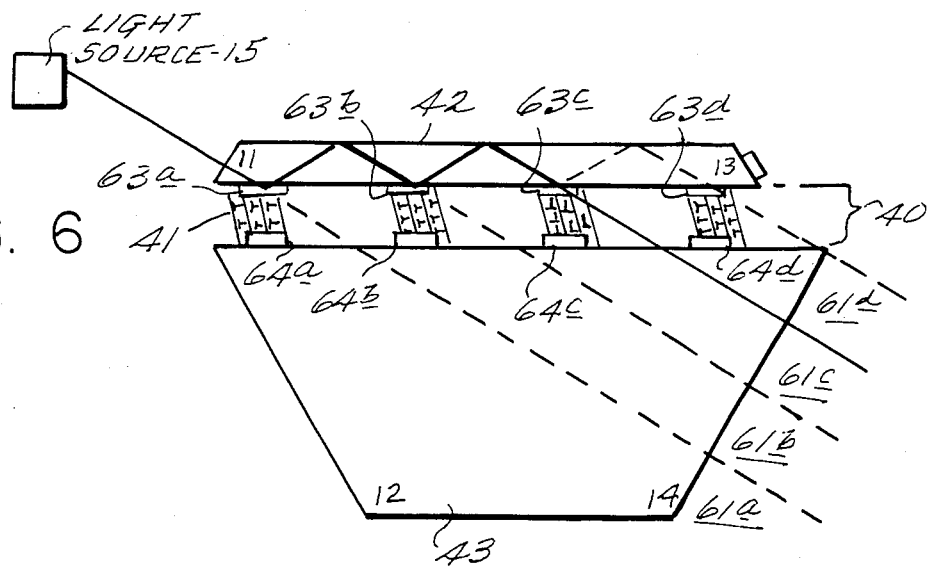
FIG. 6 is a schematic representation of an FLC 1-input, 4-output switch.

FIG. 6 shows another embodiment in which the same effect described above with reference to FIGS. 4a–4d can be used to make a 1×N (1 input routed to a chosen one of N outputs) switch. In addition, the switch of FIG. 6 can also work in reverse as an N×1 (chosen one of N inputs routed to a single output) switch. Furthermore, sets of the 1×N and N×1 devices can be combined to make an N×N switch where all N! possible connections (where each input is connected to only one output and each output is connected to only one input) are voltage selectable. FIG. 6, for example, shows a 1-input, 4-output switch where an input light ray from light source 15 incident at port 11 can be sent to any one of the four outputs 61a, 61b, 61c and 61d by applying the appropriate voltage pulses between electrodes 63a and 64a, 63b and 64b, 63c and 64c, and 63d and 64d, respectively. As shown, the third output has been chosen by applying an electric field across electrodes 63c and 64c to select a different director state than at the other electrode locations. As a result, the molecules in the portion of the FLC slab 40 between electrodes 63c and 64c are oriented to give a high refractive index such that the incident light is passed through the FLC slab 40 to the second prism 42 and to the chosen port 61c.

b. Dielectric-FLC Interface With Electric Field Applied Parallel to the Interface FIGS. 7a–7d show another embodiment of an FLC electro-optic switch in which the coordinate system is chosen such that the FLC material occupies the half-space region z<0 and the X-Y plane is the interface between the FLC and another dielectric. The smectic layer normal lies in the X-Z plane and makes a nonzero angle δ with the x-axis as shown in FIG. 7a. The Y-Z plane is chosen to be the plane of incidence, and the incident light ray from light source 15 makes an angle $\Theta_i$ with the z-axis as shown in FIG. 7b. If an electric field is applied parallel to the y-axis, the FLC molecular orientations selected by oppositely directed fields both have their unit directors $\vec{n}$ in the X-Z plane. One state will be more nearly parallel to the z-axis as shown in FIG. 7a, and the other state will be more nearly parallel to the x-axis as shown in FIG. 7c. The most favorable configuration occurs where the smectic C* tilt angle $\psi_o = 45°$, as is found in some materials with an N* to C* phase sequence, and where the layer normal also makes an angle of 45° with both the x and z axes (i.e. δ=45°). This configuration produces a device with optical states like those in the nematic devices of the prior art.

Namely, the smectic layers are oriented so that an electric field applied parallel to the y-axis selects either the state where $\vec{n}$ is parallel to the x-axis or the state where $\vec{n}$ is parallel to the z-axis depending on the sign of the electric field. When the applied field selects the state with $\vec{n}$ parallel to the z-axis, incident p-polarized light sees a refractive index $n_e$, while s-polarized light sees a refractive index $n_o$ as shown in FIG. 7b. However, when an oppositely directed electric field is applied, the refractive indices seen by the two orthogonal polarization components of the incident light are interchanged such that p-incident polarized light sees refractive index $n_o$ and s-polarized light sees refractive index $n_e$ as shown in FIG. 7d. Thus, a polarization insensitive 4-port 2×2 switch similar to the one described with reference to FIGS. 5a and 5b can be constructed even more simply since the retarders are no longer needed.

The device of FIGS. 7a–7d works like a nematic liquid crystal device of the prior art except that when a FLC layer is used, the electric field must be applied parallel to the plane of incidence (parallel to the y-axis in FIGS. 7a–7d) rather than being applied parallel to the normal to the interface plane as for nematic liquid crystal devices. The electric field may be applied parallel to the interface plane by placing an arrangement of inter-digited electrodes along the interface between the FLC layer and the dielectric. As in the other embodiments, switching time is thus greatly reduced over the devices of the prior art that use nematic liquid crystals.

Switching devices of the type discussed with reference to FIG. 6 may also be constructed using the configuration of FIGS. 7a–7d. Namely, 1×N and N×N port devices may also be made by arranging several such switches in a matrix.

c. Waveguide-FLC Interface

Figure 8A:
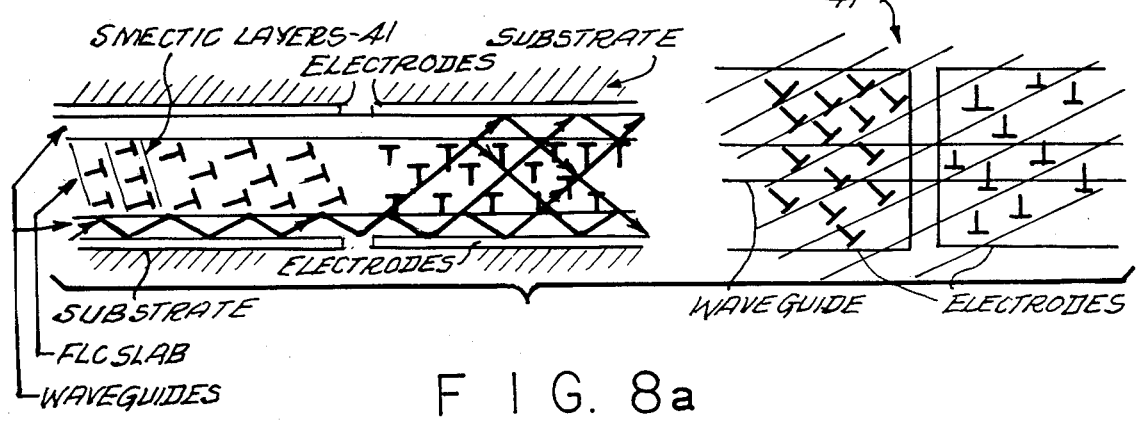
FIGS. 8a-8c are schematic representations of a switching device in which light is incident from a waveguide and may be switched from one waveguide to another.
Figure 8A:
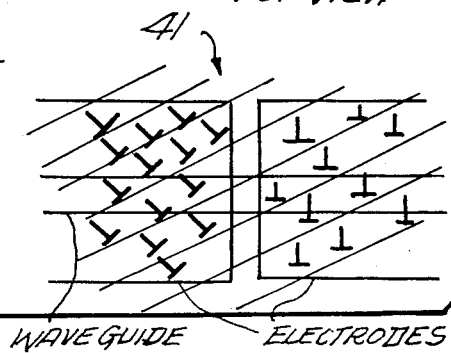
Figure 8B:
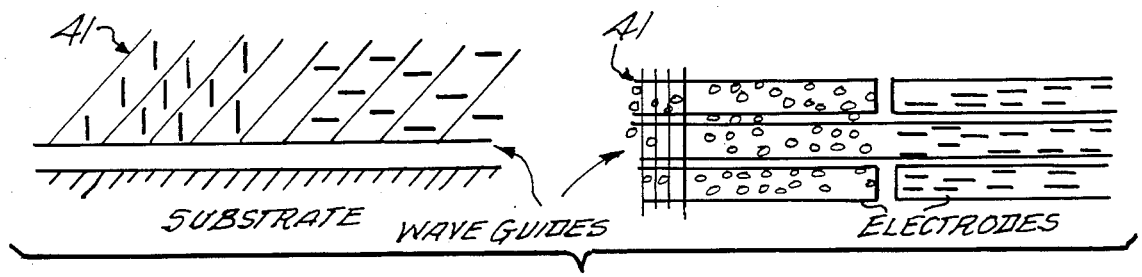
Figure 8C:
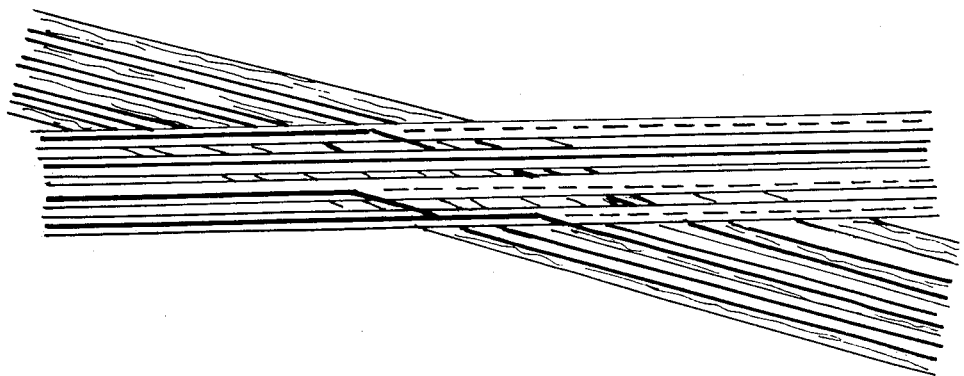

FIGS. 8a–8c show how the total internal reflection effects described above can be exploited in switching device where the light is incident from a waveguide. Here, the FLC slab separates two waveguide structures fabricated into the bounding plates. Electrodes fabricated at the waveguide-substrate interface or at the waveguide-FLC interface allow voltages to be applied to control the orientation of the FLC director. The waveguide is a high refractive-index material in which a trapped beam can propagate as shown in FIG. 8a if the refractive indices of the FLC and substrate are sufficiently low. The propagation can be viewed as a multiple total internal reflection of the trapped beam at the waveguide-FLC and waveguide-substrate interfaces. The trapping of the light in the waveguide can be controlled by the FLC orientation by the same mechanism as discussed above with reference to FIGS. 3 and 7. Switching the FLC so that it presents an index of refraction higher than that in the waveguide will allow the light to radiate out of the waveguide, pass through the FLC slab, and enter the waveguide on the other plate.

FIG. 8a shows an FLC configuration similar to that in FIG. 3 where the high and low index states are selected by electric fields applied perpendicular to the substrates, while FIG. 8b shows a configuration similar to that in FIG. 7 where the two states are selected by electric fields applied parallel to the substrates. The fraction of incident light energy that passes through the FLC into the second waveguide will depend on the geometry of the waveguide configuration, but almost any structure having a significant waveguide overlap will pass a significant fraction ($>5\%$) of the incident light energy when the FLC is switched to its high-index state, while the fraction of light passed when the FLC is in its low-index state will be much smaller. This waveguide-FLC waveguide structure can be incorporated into a nonblocking $N \times N$ routing switch as shown in FIG. 8c, where the FLC slab and waveguide layers are shown parallel to the paper. The waveguide layers are patterned into parallel channels oriented so that each channel on the top substrate crosses over every channel on the bottom substrate. The electrodes are arranged so that the FLC in each overlap area can be switched independently. Then, light launched into one of the channels on the top substrate can be coupled into any chosen channel on the bottom plate by switching the FLC where that top channel crosses the chosen bottom channel. The dotted lines in the figure show the path taken by the unswitched fraction of the incident light, which is the same path taken by all of the incident light when the FLC region is left in its low-index state. The heavy solid lines show the path taken by the light when the FLC is switched to its high-index state.

Changes in the FLC orientation produce changes only in its refractive index that affects the extraordinary mode. Since for FLCs usually $n_o < n_e$, the radiated light will always be extraordinary, leaving the light that would excite the ordinary mode in the FLC trapped within the waveguide. Thus, the most efficient switching will be obtained if the incident light is arranged to be largely of the polarization that excites the extraordinary mode in the FLC. This light radiates out of the guide most strongly if the index it sees in the FLC is not too much larger than that of the guide, i.e., if near index-matching reduces reflections at the interface in the light radiating state. Even if the FLC index is slightly less than that of the guide, the evanescent wave of light propagating in a guide on one substrate will couple to a propagating wave in the guide on the other substrate if the FLC slab is thin enough, thus allowing this device to operate in a mode where the indices presented by both field-selected FLC states are less than that of the guide, but where one index is much less than that of the guide while the other index is only slightly less than that of the guide.

d. FLC-FLC Interface

Figure 9A:
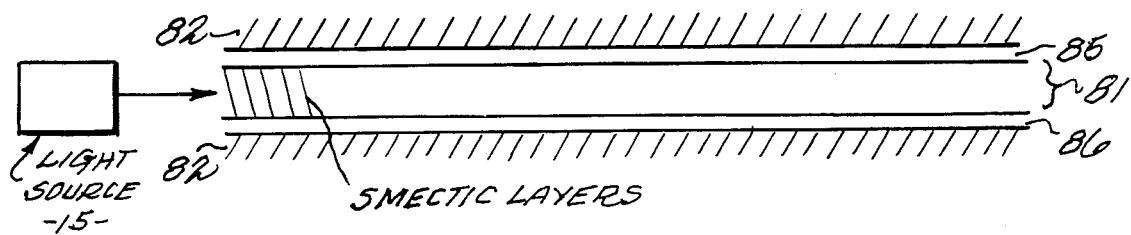
FIGS. 9a-9c are schematic representations of a switch with an FLC-FLC interface.
Figure 9B:
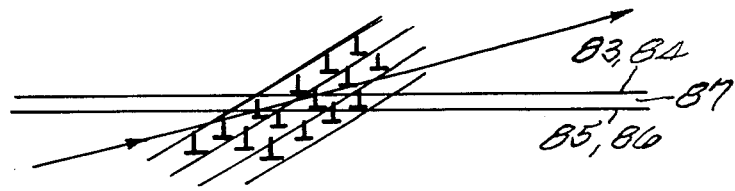
Figure 9C:
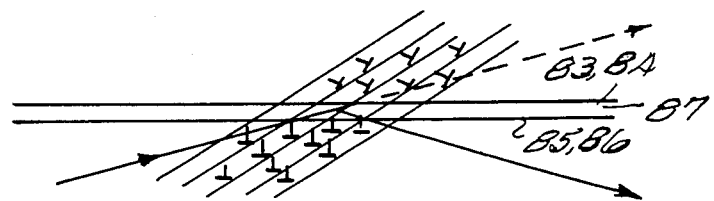

FIGS. 9a–9c show another embodiment of the present invention in which light from light source 15 is incident on the interface between two differently oriented FLC regions. FIG. 9a shows a side view of an FLC device in accordance with the present embodiment, whereas FIGS. 9b and 9c show top views of the FLC devices.

As shown in FIG. 9a, light propagates through a thin FLC slab 81 which is bounded on both sides by a low refractive index material 82 that confines light by total internal reflection so as to form a waveguide. On the surfaces of the bounding media 82 are applied electrodes 83, 84, 85 and 86 which apply voltages such that a region of the FLC is oriented either the same or differently from the surrounding region. When the voltage applied to the electrodes 83 and 84 (electrodes 83 and 84 being disposed directly across from each other on respective surfaces of bounding media 82) selects the same FLC director orientation as is obtained in the region of the slab defined by similarly disposed electrodes 85 and 86, light incident on the interface 87 between the two regions is transmitted without change as shown in FIG. 9b. However, when the voltage applied to electrodes 83 and 84 selects a different FLC director orientation than is selected in the region defined by electrodes 85 and 86, an interface 87 between dissimilar dielectrics is formed, at which the phenomenon of reflection and refraction takes place as described above with reference to FIG. 2. Total internal reflection will occur when the refractive index $n_i$ seen by the incident light in the region defined by electrodes 85 and 86 is greater than the refractive index $n_t$ that would be seen by light propagating parallel to the interface but within the region defined by electrodes 83 and 84 when the angle of incidence is oblique enough ($n_i \sin \Theta > n_t$). For propagation of light in optically anisotropic media such as FLCs, the refractive index depends on the direction of propagation of the light relative to the optic axis (i.e., director) only for the extraordinary mode, while the ordinary mode always sees the same (ordinary) refractive index. Thus, switching at an FLC-FLC interface can be obtained only for the extraordinary part of the incident light, which sees a lower refractive index the closer its propagation direction is to the director.

For the director orientations shown in FIG. 9c, light propagating parallel to the interface within the region defined by electrodes 83 and 84 is propagating closer to the director orientation than the incident light in the region defined by electrodes 85 and 86, so total internal reflection is obtained for large enough angle of incidence. The most favorable situation is the one where the largest refractive index change can be obtained, which occurs for FLC materials with large tilt angle and layers oriented near to the interface normal, as in the preparations reported by J. S. Patel and J. W. Goodby in the *Journal of Applied Physics*, volume 59, pages 2355–2360, Apr. 1, 1986. Having the smectic layers normal to the interface has the further advantage for waveguide devices that the applied field preferred states have their directors and hence their optic axes parallel to the cladding interface so as to allow the transverse electric (TE) modes of the waveguide to be made up purely of the extraordinary propagation mode, thereby allowing the light incident on the interface to be purely extraordinary and thus completely switchable.

N×N switching devices may be constructed by arranging several of the switching elements of FIGS. 9a–9c in a matrix pattern as shown in FIG. 10. Each differently oriented FLC region 91 is bounded by electrodes so that the applied field may be selectively switched in order to orient the director $\vec{n}$ either the same as or differently from the surrounding region. In FIG. 10, for example, the dotted line shows the path taken when the electrodes select the same director orientation as in the surrounding region, whereas the dark lines show the direction taken by the light when the electrodes select a different director orientation than the surrounding region.

Light does not need to propagate through the FLC medium itself for the type of switching shown in FIGS. 9a–9c and 10 to work. As noted by Terui and Kobayashi in *Proceedings of SPIE-The International Society for Optical Engineering*, Vol. 517, pages 267–274 (1984), for example, the same total internal reflection phenomena is obtained where the liquid crystal material merely forms the low index cladding for a waveguide of some higher index material. A cross section of such a waveguide switch is shown in FIG. 11.

In the embodiment shown in FIG. 11, light propagates in the high-index waveguide layer which is bordered on one side by a low index buffer layer and on the other side by low index FLC material. The effect of changing the director orientation in the FLC layer on the evanescent fields of the light propagating in the waveguide layer produces results similar to those produced by the switch discussed above with reference to FIGS. 8 and 9. Thus, each of the types of devices described above may also be constructed as a waveguide switch of the type shown in FIG. 11.

2. Continuous Devices in Section I.1. above, it was assumed that the FLC director orientation was everywhere the same, specifically that $\vec{n}$ did not depend on the normal to the boundary. However, it is well known that there are ways to produce inhomogeneities in the director orientation by making $\vec{n}$ depend on the direction perpendicular to a surface that bounds the FLC. For instance, the surface (the portion of the FLC immediately adjacent the interface) may prefer one sign of $\vec{P}\cdot\vec{s}$, where $\vec{s}$ is the outward surface normal unit vector of the interface, and an applied electric field or another nearby surface may prefer the oppositely directed $\vec{P}$. Thus, if the FLC layers are oriented in this manner with respect to the applied field, a region may be produced close to the surface where the direction of $\vec{P}$ and hence $\vec{n}$ varies.

a. Case 1—Surface-preferred $\vec{n}$ giving low refractive index

Figure 3B:
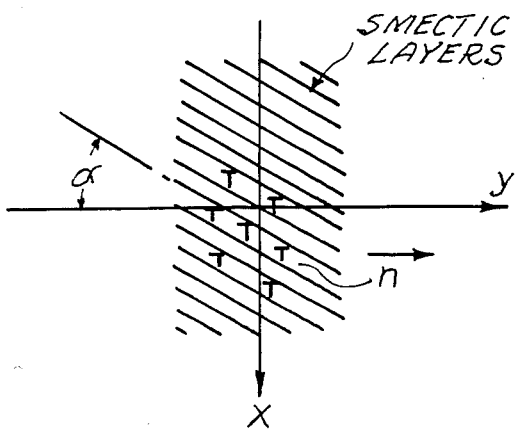
Figure 3C:
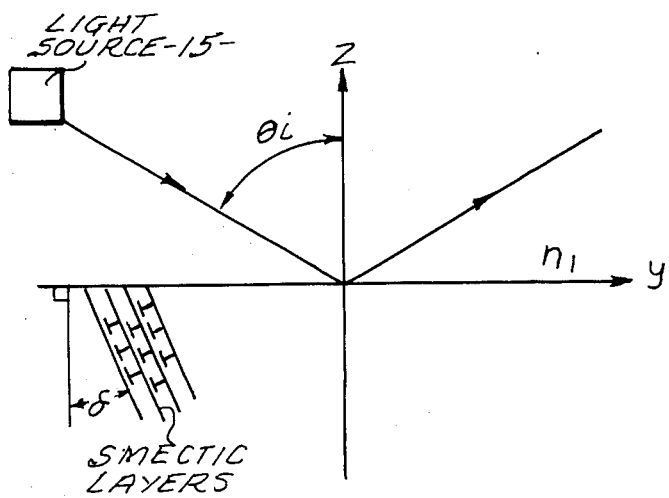
Figure 3D:
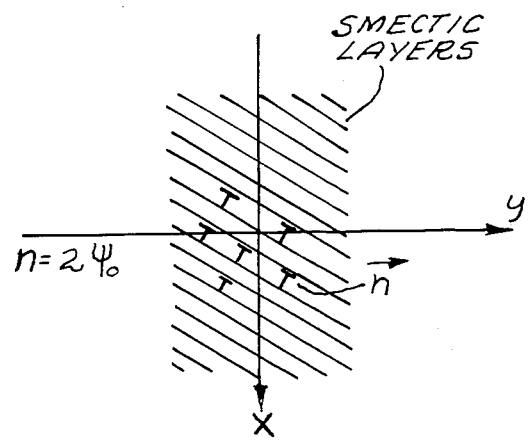

In the embodiment shown in FIGS. 3a–3d, the interface between the FLC and the other dielectric may prefer the orientation of $\vec{P}$ that gives a director orientation presenting low refractive index to incident s-polarized light (FIG. 3d). If an electric field that prefers the oppositely directed $\vec{P}$ is applied to the FLC when in the orientation shown in FIG. 3d, it is possible that the director orientation will vary from that preferred by the interface in the region immediately adjacent the interface to that preferred by the applied field some distance away from the interface. In this manner, the "depth" $\xi$ of the interface may be varied. In fact, most of the variation will take place within a distance $\xi$ from the interface, where:

$$\xi \equiv [K/(PE)]^{\frac{1}{2}},$$

with K equal to the FLC's Oseen-Frank elastic constant, P equal to the ferroelectric polarization magnitude, and E equal to the strength of the applied field.

Thus, for a low applied electric field $\xi$ is large, and the region close to the interface has the orientation with a low refractive index for s-polarized light so that total internal reflection occurs as shown in FIG. 12a. As the applied electric field is increased, $\xi$ decreases, eventually becoming comparable to the penetration depth of the light's field into the FLC. At this point an appreciable quantity of light starts being transmitted as shown in FIG. 12b. Further increases in the applied electric field cause further decreases in $\xi$, thereby causing further increases in the transmitted portion of the light. This enables the transmitted and reflected light intensities to be controlled in a continuous method by varying the magnitude of the applied electric field. In general, the transmitted light will be elliptically polarized, with the eccentricity and major axis direction of the ellipse changing as the applied voltage is changed, becoming linearly polarized in the limit $\xi<<\lambda$, where $\lambda$ equals the light's vacuum wavelength.

b. Case 2—Surface-preferred $\vec{n}$ giving high refractive index

When the surface of the FLC has the preferred orientation shown in FIG. 3b, for low applied electric fields and large $\xi>>\lambda$, where $\lambda$ is the vacuum wavelength of the incident light, the layer immediately adjacent to the interface has the orientation giving a large refractive index to s-polarized light, which is initially transmitted. As this light propagates through the FLC, the FLC's director orientation $\vec{n}$ gradually changes; however, as long as $\xi>>\lambda$, the polarization of the transmitted light just "adiabatically" follows along the optical axis direction defined by $\vec{n}$ as shown in FIG. 13a. This propagation in the Maugin limit (i.e. where the light follows the twist of the helix of the liquid crystal) is exactly the phenomena exploited by the twisted nematic devices of the prior art. In other words, in the Maugin limit, light which is initially s-polarized is nearly completely transmitted through the FLC region. As the electric field is increased, $\xi$ shortens to become comparable to $\lambda$, and the Maugin condition ($\xi>>\lambda$) is no longer satisfied. The light then no longer follows the optical axis direction as shown in FIG. 13b. Thus, an appreciable quantity of the incident light will be reflected even though it will not still be polarized perpendicular to the plane of incidence. In fact, the reflected light will not be linearly polarized at all, for it will become elliptically polarized.

As the electric field is increased so that $\xi<<\lambda$, the device operation reverts to that described above with reference to the discrete-state devices (Section I.A.1.). The incident light then will be totally internally reflected. This makes possible transmission versus applied voltage characteristics which are opposite to those of the device of case 1 described above in Section I.A.2.a.

B. Direction Changing Devices

The electro-optic effects described in Section A above rely on the changes in the complex amplitudes describing the electric field of the light produced upon reflection and refraction of the light at an interface between two dielectrics, at least one of which is an FLC. Another effect that may be exploited to produce practical electro-optic switching devices is the change in the direction of propagation of the transmitted light caused by refraction at a dielectric interface. For example, if two dielectric media, 1 and 2, have an interface between them defining the X-Y plane, with light incident in the Y-Z plane through medium 1 and the unit vector $\vec{s}_i$ normal to its wavefronts making an angle $\theta_i$ to the z-axis, the refractive index experienced by this light is $n_i$ as shown in FIGS. 14a and 14b. (Note that in FIGS. 14a and 14b, $\theta_i = \theta_t = 0$.). At the interface this light is generally partly reflected and partly refracted (transmitted). Furthermore, if the angle between the unit vector $\vec{s}_t$ normal to the transmitted light's wavefronts and the z-axis is $\theta_t$, the index of refraction experienced by this light in medium 2 is $n_t$. Then under the general form of Snell's law relating the angle of incidence to the angle of refraction, the relationship results:

$$(n_i\vec{s}_i - n_t\vec{s}_t) \times \vec{z} = 0.$$

Thus, if an FLC comprises the second medium, electrically induced changes in its molecular orientation will produce changes in the optic axis direction and in the refractive index $n_t$ that affects extraordinary light. The changes in $n_t$ cause changes in the propagation direction $\vec{s}_t$, and the changes in the optic axis direction cause further changes in the ray or direction along which the optical energy flows since this direction is not parallel to the wave propagation direction for extraordinary light unless it is propagating along or perpendicular to the optic axis.

As an example of this direction-changing effect, let the first medium be glass and the second be an FLC with the smectic layers parallel to the interface as shown if FIGS. 14a and 14b. The two states of the FLC selected by the applied electric fields which are parallel or antiparallel to the x-axis have their optical axes either at an angle $+\psi_0$ (FIG. 14a) or $-\psi_0$ (FIGS. 14b) from the layer normal. Light normally incident on this interface with polarization parallel to the y-axis will be transmitted across the interface with its propagation direction unchanged, but the extraordinary ray will be refracted, with the direction of refraction depending upon which of the two FLC states is selected. For $n_o < n_e$, as is usually the case for FLCs, the refracted ray lies on the same side of the z-axis as the optical axis.

Figure 15:
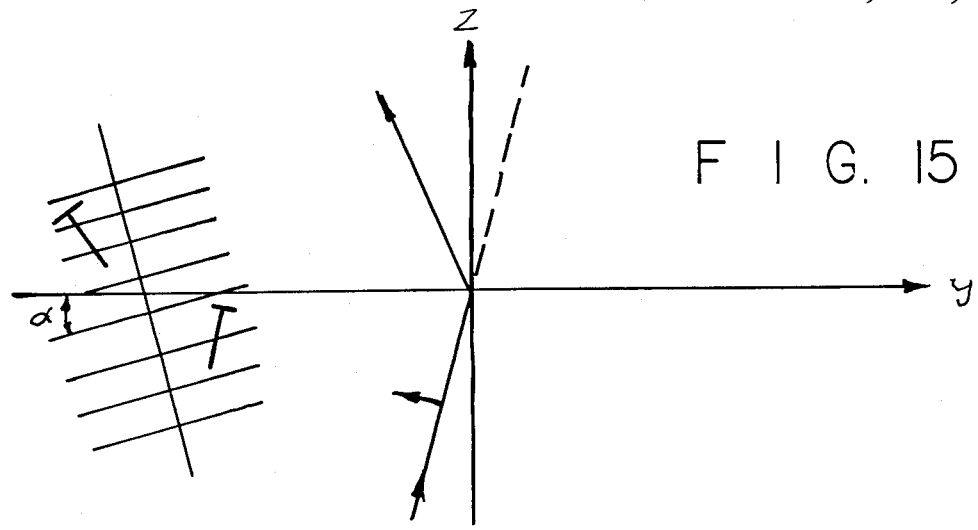
FIG. 15 is a schematic representation of the direction changing principle shown with reference to FIG. 14 which occurs at an FLC-FLC interface.

FIG. 15 shows a further example of this direction changing principle. In FIG. 15 both media are FLCs with their layers tilted by the same angle $\delta$ away from the perpendicular to the plane of incidence and intersecting the plane of incidence at the same angle $\alpha$ to the y-axis. If the director state is the same in both regions, the optical axis orientation will be the same in both regions, and there will be no reflection or refraction regardless of the angle of incidence (as shown by the broken line light path). On the other hand, if electric fields applied along the x-axis have selected different director states in the two regions, there will be a change in optical axis direction across the interface, and refraction of the extraordinary ray will again take place.

Figure 16A:
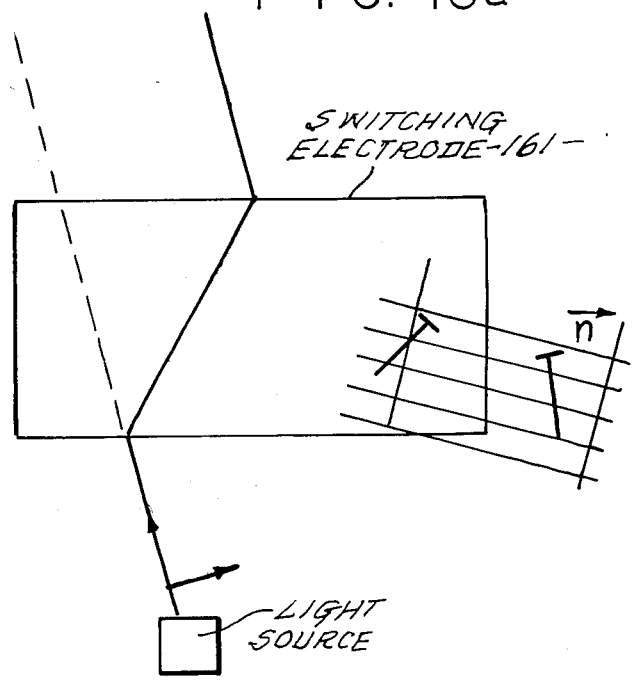
FIGS. 16a and 16b are schematic representations of direction changing devices exploiting the direction changing principal shown with reference to FIG. 14.
Figure 16B:
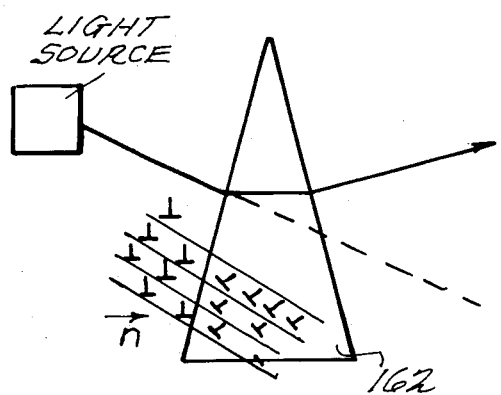

A particularly simple embodiment of a direction-changing device exploiting the principle of FIG. 15 is diagramed in FIG. 16a. The broken line shows the path of incident light when the FLC director orientation is the same throughout both regions. However, when the voltage applied to the electrode 161 has selected a different orientation, the extraordinary light follows the solid path and emerges from the electrode area displaced from the original path. Another simple embodiment is shown in FIG. 16b. Again, when the FLC director orientation is the same throughout, the incident light travels along a straight path (the broken line). When the director state under the electrode 162 is selected to be different from that in the surrounding region, the transmitted extraordinary ray follows the solid line, and emerges from the electrode in a changed direction. Thus, if the opposite faces of the FLC regions are parallel (FIG. 16a), the light may be displaced from its original path; however, if the opposite faces are not parallel, the direction of the incident light may be changed.

These direction-changing effects can be exploited in devices where the incident light is confined to propagate within an FLC slab by the waveguide principles given above with reference to FIG. 9. As also noted with reference to FIG. 11, the light need not propagate within the liquid crystal itself, allowing these effects to be also achieved in a configuration where the FLC is the cladding for a higher index waveguide.

II. CONSTRUCTION OF FLC ELECTRO-OPTIC SWITCHES

Section I above was related to the various geometries which may be used with ferroelectric liquid crystals to achieve electro-optic switching effects in accordance with the present invention. In this section are described ways for constructing and operating such devices. Most of the described techniques are equally applicable to the SSFLC devices previously described in U.S. patent application Ser. Nos. 797,021 and 511,733, now U.S. Pat. No. 4,563,059.

Figure 17:
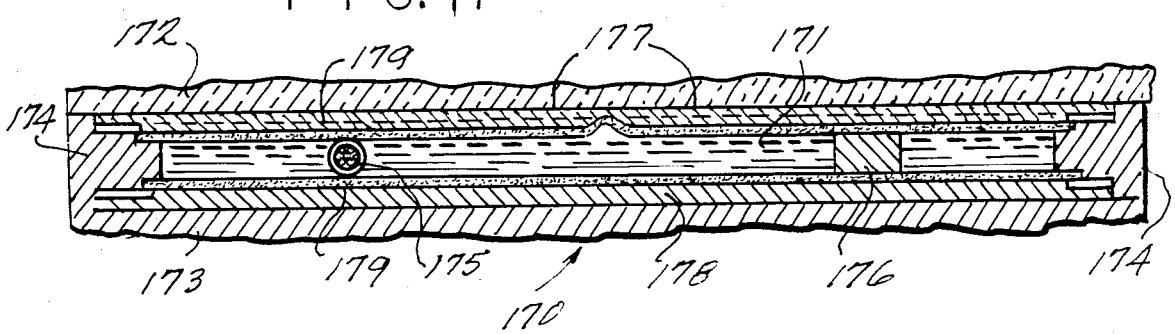
FIG. 17 is a schematic representation of an FLC cell of the preferred embodiment of the present invention.

A general prototype of an FLC cell in accordance with the preferred embodiment of the present invention is shown in cross-section in FIG. 17. FLC cell 170 comprises FLC material 171 which is confined to a gap between two glass plates (or other suitable dielectric media) 172 and 173. The edges of the gap are sealed with a spacer gasket 174 that also helps to define the gap spacing. Distributed spacer particles 175 and deposited spacer pads 176 further define the gap spacing. The glass plates 172 and 173 are coated with electrically conducting layers 177 and 178 which are patterned into electrodes, and the plates are further coated with a rubbed polymer layer 179 for orienting the FLC layers. The material composition of each of these elements will be discussed below.

The first known ferroelectric liquid crystal material to be synthesized was described by Meyer et al in *Le Journal de Physique*, Vol. 36, pp. L-69-71, March, 1975, and is commonly called DOBAMBC (p-decyloxybenzylidene p-amino 2-methyl butyl cinnamate). Although all of the devices described herein could be made from DOBAMBC, it exhibits several disadvantages which make it undesirable for use in the present invention. First, because the ferroelectric phases in DOBAMBC occur at temperatures well above the usual ambient temperatures, the devices would have to be externally heated in most environments. Second, DOBAMBC is not chemically stable and is susceptible to hydrolysis of the C=bond. Thus, under most operating conditions, DOBAMBC decomposes so that after an inconveniently short period of time the material no longer exhibits ferroelectric liquid crystal phases.

At the present time, many other FLC materials with greatly improved properties are commercially available from a number of sources, and by mixing several different compounds together, FLC materials with broad temperature ranges spanning the usual ambient can be obtained. Furthermore, by using chemically stable components, it is also possible to ensure that the resulting mixture does not decompose appreciably with time. For example, the commercially available mixture CS-1014 (Chisso Corp.) may be used in the construction of the electro-optic switching devices of the present invention; however, other ferroelectric liquid crystal materials may be used depending upon the operating conditions.

Since the FLC is partly fluid in nature, a liquid crystal (LC) cell must be constructed for containing the material. In addition, the LC cell must also provide a convenient means for supporting the necessary electrodes and alignment layers 179. By way of example, in FIG. 17 the LC cell 170 is shown to enclose a planar FLC layer 171. This planar FLC layer is contained by placing two solid dielectric materials 172 and 173 (which may be transparent glass plates formed from a variety of silicate glasses or plates formed of a transparent flexible polymer or plates of some other dielectric material) with their planar faces towards each other such that a gap for containing the FLC is defined between the parallel faces. The gap between the faces is defined by placing a spacing gasket 174 of desired thickness around the edge of the gap and distributing spacers 175 and 176 throughout the gap. The spacing gasket 174 may also be formed of a sealing material and used to seal in the FLC.

The spacers 175 and 176 can be deposited on the planar faces of the plates 172 and 173 by a number of techniques. For example, the spacers may be formed by evaporating materials inert to the FLC such as SiO or by patterning a spun-on layer of a polymer such as polyamide onto the plate faces. Alternately, the spacers may be comprised of hard particles such as glass fibers or polymer spheres which are distributed in the liquid crystal material itself.

The FLC material 171 may be introduced onto the gap between the plates by a variety of methods. When the gap is small (a few hundreds of microns or less), a liquid that partially fills the gap experiences large capillary forces that cause it to flow further into the gap. Thus, if the cell is heated to a temperature high enough to cause the FLC material to enter its isotropic liquid phase, material placed at the edge of the gap will flow into the gap until the gap is full. Evacuation of air from the gap prior to filling may also be used to speed up the filling procedure.

As noted in Section I, the present invention has several useful electro-optic switching properties depending upon the geometry of the FLC layers, the applied field, and the molecular orientation. As shown in FIGS. 3–16, for example, each of the different embodiments of the present invention require that the smectic layers be aligned at predetermined angles to a chosen direction. This smectic layer alignment may be achieved by a variety of different methods. For example, as shown in FIG. 17, an anisotropic coating 179 may be applied to either or both of the bounding plates 172 and 173 in a manner similar to that commonly used for aligning nematic liquid crystals. Several techniques for producing such coatings are described by J. S. Patel et al in *Ferroelectrics,* Vol. 59, pp. 137-144 (1984) and J. S. Patel et al in *Journal of Applied Physics,* Vol. 59, No. 7, Apr. 1, 1986, pp. 2355-60.

Figure 18:
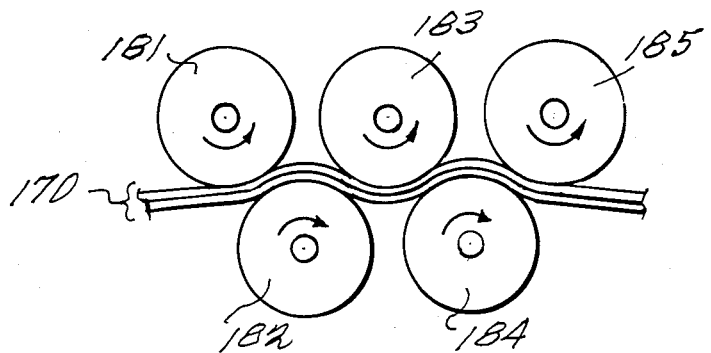
FIG. 18 is a schematic representation of a means for producing alignment of the smectic layers of applying a shear strain to the FLC.

Another method for aligning the layers is shown in FIG. 18. As shown, a gentle shear strain is applied to the FLC cell 170 in order to orient the smectic layers. For this technique, the FLC cell 170 must be composed of two somewhat flexible plates and passed between rollers 181, 182, 183, 184 and 185, respectively, which are alternately offset and rotate in opposite directions. The resulting undulation of the cell produces a shear strain that orients the layers of the smectic material parallel to the direction of motion of the plates. Other known means for producing the required shear strain may also be used within the scope of the present invention.

Referring back to FIG. 17, FLC cell 170 of the present invention also requires a means for applying an electric field to the FLC layer 171. A simple technique for applying voltages to the FLC cell 170 uses electrically conducting layers 177 and 178 attached to the bounding plates 172 and 173. Using these conductors, electric fields are applied transverse to the FLC layer by applying a voltage between the respective bounding surfaces 172 and 173. In addition, when electric fields parallel to the FLC layer are required, as in the embodiment shown in FIGS. 7a-7d, a voltage may be applied between two adjacent electrodes on the same bounding plate. The conducting layers 177 and 178 may be fabricated by vacuum evaporation of a thin layer (e.g., 1000 Å thick) of a metal such as aluminum onto the bounding plate. In addition, when it is desirable that light pass through the conducting area, a transparent conductor such as indium-tin oxide may be applied instead to the bounding plates by vacuum deposition using known methods.

Although many means may be used for producing the voltages needed to change the FLC director orientation, means that are controlled by light are particularly advantageous for the electrooptic switching function of the device of the present invention. A desirable means for producing the switching voltages produces electric power from light falling on a photovoltic device (PVD). Typical PVDs produce voltages between 0.5 and 1.5V; however, these voltages are barely large enough to produce switching when applied across FLC layers of practical thickness ($\geq 1$ $\mu$m). Fortunately, there are many known DC-to-DC conversion methods for obtaining larger voltages. DC-to-DC converters that operate with efficiencies in excess of 80% are readily available for this purpose.

Figure 19A:
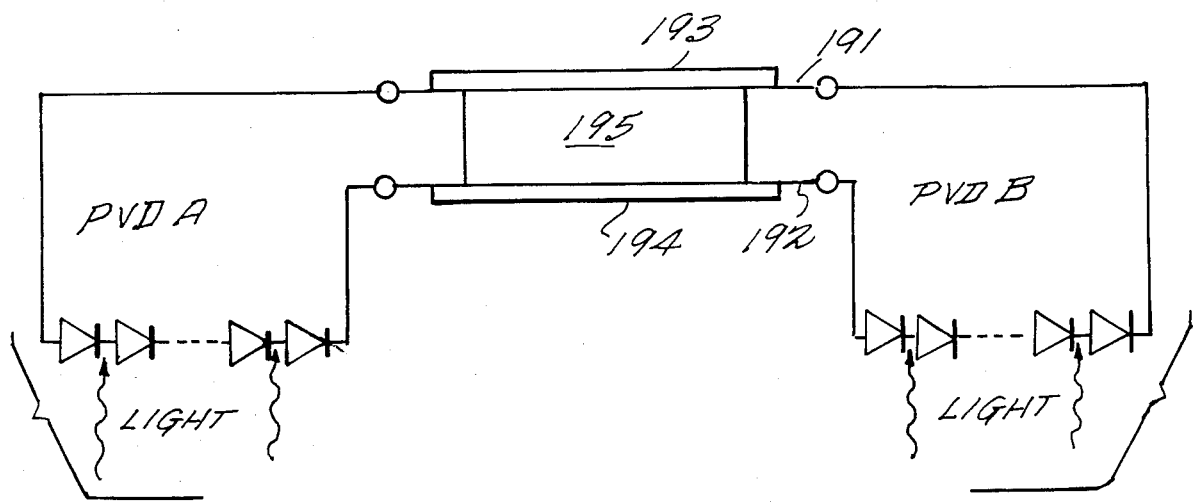
FIGS. 19a and 19b are schematic representations of devices for producing the switching voltages used by the FLC from incident light.

Another simple method for obtaining higher voltages from the PVDs is to simultaneously illuminate several PVDs that are electrically connected in series. Monolithic arrays of silicon PVDs may be connected in series as shown in FIG. 19a so as to give usable voltages higher than 10V, if desired. By applying the resulting voltage across an FLC device, the switching of the molecular states of the FLC may be performed responsive solely to the incident light. As shown in FIG. 19a, two series-connected multiple-element PVDs may be connected with opposite polarity across electrodes 191 and 192 on the surface of plates 193 and 194, respectively, so as to change the molecular orientation of the FLC material 195. The PVDs are arranged to detect incident light from opposite sources for applying the proper voltage polarity to the cell. For example, when light falls on PVD A but not on PVD B, a positive voltage is produced across the FLC device, thereby switching it into a first optical state. However, when light falls on PVD B but not on PVD A, a negative voltage is produced across the FLC device, thereby switching it to a second optical state. In this manner, the FLC may be switched between two states solely by the application of light.

Optical switching devices using FLCs which are powered by PVDs are particularly advantageous because of their low voltage and low power electrical requirements for switching, for only a modest amount of light needs to fall on the PVDs in order to produce the switching. The amount of electric charge needed to switch an FLC device of unit active area is 2P, where P is the ferroelectric polarization. Values for P for typical materials are on the order of 10 nC/cm$^2$. Since typical PVDs produce 0.5 A per watt of incident light, only $2 \times 10^{-7}$ of light energy is required to produce enough electric energy to switch a centimeter square FLC device if a factor of 10 is allowed for the necessary voltage increase.

Figure 19B:
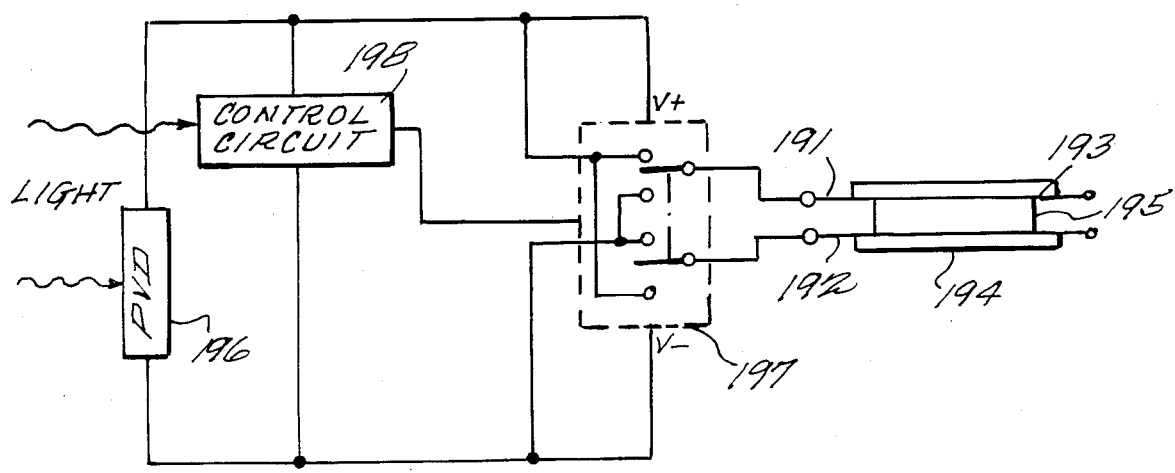

Other techniques may be used for controlling the FLC switching devices using PVDs as shown in FIG. 19b. As shown, a single PVD 196 and an analog FET switch 197 for reversing the applied voltage may be used to switch the voltage applied to the FLC. Enough power can be obtained from the PVD 196 to power the FET analog switch 197 to alternate the polarity of the voltage applied to electrodes 191 and 192 on the bounding plates 193 and 194. A control circuit 198 may be used to control the state of the FLC depending upon the received light. In addition, the light that falls on the PVD 196 can be supplied from a port separate from the various input and output ports of the FLC device, or one of the FLC device's ports can be used at least in part to provide the light to PVD 196.

When the device of FIG. 19b is in operation, the light is detected by PVD 196, and the sign of the voltage applied across the FLC is reversed by the FET analog switch 197. The state of the switch 197 and hence the FLC device is controlled by the state of control circuit 198. For example, control circuit 198 may be controlled by the incident light to change state every time the incident light beam is momentarily interrupted. In this manner, the FLC may be caused to switch state without using complicated external switching control circuitry.

Although a number of exemplary embodiments of this invention have been described in detail above, those skilled in the art will readily appreciate that many additional modifications are possible in the exemplary embodiments without materially departing from the novel teachings and advantages of this invention. Accordingly, all such modifications are intended to be included within the scope of this invention as defined in the following claims.

What we claim is:

1. A liquid crystal electro-optical switching device, comprising:
    a first dielectric;
    a second dielectric comprising a quantity of ferroelectric liquid crystal (FLC) having a plurality of adjacently disposed molecular layers, a unit vector molecular director field n, and refractive indices determined by said director field, said liquid crystal being disposed adjacent said first dielectric so as to form a boundary therebetween;
    means for applying electric fields to said second dielectric, said electric fields having a significant component parallel to said layers and an intensity sufficient to change the direction of said director field, said director field direction change further producing a change in said refractive indices of said second dielectric; and
    means for directing light to be incident on said boundary, changes in said director field causing changes in the manner in which said incident light interacts with said boundary.

2. A device as claimed in claim 1, wherein interaction of said incident light with said boundary causes part of said incident light to be reflected, an changes in said director field cause changes in the intensity of said reflected light.

3. A device as claimed in claim 2, wherein said electric fields are applied perpendicular to said boundary, such that in a first state of said director field selected by said electric fields the director field is more nearly parallel to that direction parallel to both the plane of incidence of said light and said boundary so as to cause substantially total reflection of said incident light so that the intensity of said reflected light is substantially equal to the intensity of said incident light and substantially no light is transmitted across said boundary, and in a second state of said director field selected by said electric fields the director field is less nearly parallel to the direction parallel to both the plane of incidence of said incident light and said boundary than the director field in said first state, thereby causing substantially less than total reflection of said incident light so that an appreciable portion of said incident light is transmitted across said boundary.

4. A device as claimed in claim 3, further comprising a third dielectric, said first and third dielectrics being prisms containing a plurality of prism faces, said FLC being disposed in a slab between a selected one of the prism faces of each of said first and third dielectrics, said electric fields being applied perpendicular to said selected faces.

5. A device as claimed in claim 4, wherein said prisms are made of glass.

6. A device as claimed in claim 4, wherein a polarization component of said incident light passing through at least one of said prisms creates an extraordinary ray when passing through said ferroelectric liquid crystal, the refractive index affecting said polarization component in said at least one prism being approximately equal to the refractive index affecting said extraordinary ray in said ferroelectric liquid crystal for said second orientation state.

7. A device as claimed in claim 6, wherein when said refractive index of said at least one prism is equal to the refractive index affecting the extraordinary ray in said ferroelectric liquid crystal for said second orientation state, said prisms and said FLC slab operate as a polarizing beam-splitter which substantially completely separates out two orthogonal linear polarization components that make up an incident light ray of an arbitrary polarization state by transmitting the polarization component that excites the extraordinary ray in said FLC slab while reflecting the other polarization component.

8. A device as claimed in claim 6, wherein two of said plurality of prism faces of each of said prisms define first and second incident ports, respectively, for enabling light to enter or exit each of said prisms such that unpolarized light incident on the first incident port of each of said prisms is reflected by said FLC slab to the second incident port of the same prism when said director field is in said first state and is partially reflected by and partially transmitted through said FLC slab when said director field is in said second state, said reflected light having a first polarization and being reflected to the second incident port of the same prism, and said transmitted light having a second polarization and being transmitted to the second incident port of the other prism.

9. A device as claimed in claim 8, wherein light of said second polarization incident on the first incident port of each of said prisms is reflected by said FLC slab to the second incident port of the same prism when said director field is in said first state and is transmitted through said FLC slab to the second incident port of the other prism when said director field is in said second state.

10. A device as claimed in claim 9, wherein the first incident port of each of said prisms are optically connected to the second incident port of the same prism when said director field is in said first state and the first incident port of each prism is optically connected to the second incident port of the other prism when said director field is in said second state.

11. A device as claimed in claim 8, further comprising retarders disposed in light paths of said prisms for changing the polarization of light of said first polarization to light of said second polarization and light of said second polarization to light of said first polarization, thereby enabling incident light of said first and second polarizations to exit through the same incident port.

12. A device as claimed in claim 11, wherein the retardation of each of said retarders is varied such that light incident on the first incident port of each of said prisms is output at the second incident ports of each of said prisms, the ratio of the intensity of the light output at the second port of one prism to the intensity of the light output at the second port of the other prism being controlled by the amount of retardation effected by said retarders.

13. A device as claimed in claim 4, wherein one of said prisms contains an incident port and the other prism contains a plurality of optical output ports, said means for applying electric fields further allowing said electric fields to be selectively applied at predetermined locations along said selected prism faces such that light incident on said incident port may be output at a selected one of said optical output ports.

14. A device as claimed in claim 2, wherein said electric fields are applied in a direction parallel to said boundary, and said plurality of adjacently disposed molecular layers are tilted at an angle $\delta$ ($\delta < 90°$) with respect to a perpendicular to said boundary, said director field being oriented in a first state more nearly perpendicular to said boundary by a first electric field, and in another state more nearly parallel to said boundary by a second electric field directed opposite to said first electric field.

15. A device as claimed in claim 14, wherein $\delta = 45°$.

16. A device as claimed in claim 14, further comprising a third dielectric, said first and third dielectrics being prisms containing a plurality of prism faces, said FLC being disposed in a slab between a selected one of the prism faces of each of said first and third dielectrics, said electric fields being applied perpendicular to said selected faces.

17. A device as claimed in claim 16, wherein two of said plurality of prism faces of each of said prisms define first and second incident ports, respectively, for enabling light to enter or exit each of said prisms such that unpolarized light incident on the first incident port of each of said prisms is partially reflected by said FLC slab to the second incident port of the same prism and partially transmitted through said FLC slab to the second incident port such that when said director field is in said first state, said reflected light has a first polarization and said transmitted light has a second polarization, and when said director field is in said second state, said reflected light has said second polarization and said transmitted light has said first polarization.

18. A device as claimed in claim 17, wherein the first incident port of each of said prisms are optically connected to the second incident port of the same prism when said director field is in said first state and the first incident port of each prism is optically connected to the second incident port of the other prism when said director field is in said second state.

19. A device as claimed in claim 1, wherein interaction of said incident light with said boundary causes part of said incident light to be reflected, and changes in said director field cause changes in the polarization state of said reflected light.

20. A device as claimed in claim 19, wherein interaction of said light with said boundary causes said changes in said polarization state of said reflected light due to differences in the magnitudes of changes in the intensities of two orthogonally polarized components of said reflected light.

21. A device as claimed in claim 19, wherein interaction of said light with said boundary causes said changes in said polarization state of said reflected light due to differences in the magnitudes of changes in the phases of two orthogonally polarized components of said reflected light.

22. A device as claimed in claim 1, wherein interaction of said incident light with said boundary causes part of said incident light to be transmitted across said boundary, and changes in said director field cause changes in the direction of transmission of said transmitted light.

23. A device as claimed in claim 22, wherein said first dielectric comprises glass, said molecular layers are parallel to said boundary, and said electric fields are applied approximately in parallel with said boundary.

24. A device as claimed in claim 1, wherein the director field depends on a normal to said boundary such that a region of said FLC within a distance $\xi$ from said boundary assumes a first ferroelectric polarization orientation and a region of said FLC at a distance greater than $\xi$ from said boundary assumes a second ferroelectric polarization orientation different from said first polarization orientation, thereby causing the director field to take first and second orientations at a distance from said boundary which is less than $\xi$ and greater than $\xi$, respectively.

25. A device as claimed in claim 24, wherein $\xi$ is approximately equal to $[K/(PE)]^{\frac{1}{2}}$ with K equal to the Oseen-Frank elastic constant of said ferroelectric liquid crystal, P equal to the ferroelectric polarization magnitude, and E equal to the strength of an electric field applied by said means for applying electric fields.

26. A device as claimed in claim 25, wherein said means for applying electric fields includes means for continuously varying the strength of the electric field E so as to continuously vary the intensity of light transmitted and reflected by said boundary.

27. A device as claimed in claim 1, wherein said first dielectric comprises a quantity of ferroelectric liquid crystal having a plurality of adjacently disposed molecular layers, a unit vector molecular director field $\vec{n}$, and refractive indices determined by said director field, and said means for applying electric fields applies first electric fields to said first dielectric and second electric fields to said second dielectric, said first and second electric fields having a significant component parallel to said layers and intensities sufficient to change the direction of said director fields of said first and second dielectrics, respectively, said director field direction changes further producing changes in the refractive indices of said first and second dielectrics.

28. A device as claimed in claim 27, wherein interaction of said incident light with said boundary causes part of said incident light to be reflected, and changes in at least one of said director fields cause changes in the intensity of said reflected light.

29. A device as claimed in claim 28, wherein when said first and second electric fields select substantially the same director field states in said first and second dielectrics said incident light is substantially transmitted across said boundary, and when said first and second electric fields select different director field states in said first and second dielectrics said incident light is substantially reflected at said boundary.

30. A device as claimed in claim 29, wherein a plurality of said boundaries are arranged such that said reflected and transmitted light from each of said boundaries may be directed to one of a plurality of optical paths by varying at least one of said first and second electric fields.

31. A device as claimed in claim 30, wherein said boundaries are arranged in a matrix such that light incident at each of said boundaries may be directed along one of said plurality of optical paths.

32. A device as claimed in claim 27, wherein interaction of said incident light with said boundary causes part of said incident light to be reflected, and changes in at least one of said director fields cause changes in the polarization state of said reflected light.

33. A device as claimed in claim 27, further comprising first and second bounding plates, said first and second dielectrics being disposed between and adjacent to said first and second bounding plates so as to create further boundaries between each of said plates and said dielectrics.

34. A device as claimed in claim 33, wherein light incident through one of said first and second dielectrics is reflected at said further boundaries, thereby being confined within said first and second dielectrics.

35. A device as claimed in claim 33, wherein one of said bounding plates further comprises a waveguide layer disposed adjacent said dielectrics and a substrate adjacent said waveguide layer such that said dielectrics and said substrate form cladding for said waveguide layer, said incident light also propagating through said waveguide layer, said waveguide layer comprising a high refractive index material such that said light propagating through it is confined within it by total internal reflection.

36. A device as claimed in claim 27, wherein interaction of said light with said boundary causes part of said light to be transmitted across said boundary, and changes in the direction of said director field cause changes in the direction of transmission of said transmitted light.

37. A liquid crystal electro-optical switching device, comprising:
a quantity of ferroelectric liquid crystal of the chiral tilted smectic phase containing a plurality of molecules disposed in a plurality of layers and a unit vector molecular director field $\vec{n}$;
means for containing said quantity of ferroelectric liquid crystal including dielectric means disposed with respect to said ferroelectric liquid crystal so as to form a boundary therebetween;
means for obtaining a desired orientation of said layers;
means for applying electric fields to said ferroelectric liquid crystal, said electric fields selecting between a plurality of orientations of said director field; and
means for directing light toward said boundary so as to cause said light to interact with said boundary in a manner determined by said director field orientation.

38. A device as claimed in claim 37, wherein said containing means further comprises spacing means and said dielectric means comprises first and second dielectric plates, parallel to each other, separated by said spacing means, said first and second dielectric plates and spacing means together containing said ferroelectric liquid crystal.

39. A device as claimed in claim 38, wherein said spacing means is formed from at least one of glass fibers and polymer spheres.

40. A device as claimed in claim 38, wherein said first and second plates are made of an optically transparent dielectric material.

41. A device as claimed in claim 40, wherein said dielectric material is glass.

42. A device as claimed in claim 40, wherein said first and second plates are made of transparent, flexible polymer.

43. A device as claimed in claim 38, wherein said means for applying electric fields comprises a plurality of electrodes disposed proximate to said ferroelectric liquid crystal and means electrically connected to said electrodes for producing voltage differences therebetween.

44. A device as claimed in claim 43, wherein said electrodes comprise first and second conducting layers attached to a surface of said first and second plates.

45. A device as claimed in claim 44, wherein said first and second conducting layers are both attached to the same plate.

46. A device as claimed in claim 44, wherein said first and second conducting layers are attached to different plates.

47. A device as claimed in claim 44, wherein said first and second conducting layers are transparent.

48. A device as claimed in claim 43, wherein said means for producing voltage differences comprises photovoltaic devices which produce a voltage difference when illuminated by light.

49. A device as claimed in claim 48, wherein said photovoltaic devices comprise a plurality of low power photovoltaic elements connected so as to produce a higher power output than that produced by a single photovoltaic element.

50. A device as claimed in claim 48, wherein said photovoltaic devices are divided into a first group and a second group such that illumination of the first group but not the second group produces a first state of said voltage differences between said electrodes, and illumination of the second group but not the first group produces a second state of said voltage differences between said electrodes different from said first state.

51. A device as claimed in claim 48, wherein said means for producing voltage differences further comprises:
a switch connected to said photovoltaic devices; and
a control circuit for selectively changing the state of said switch so as to reverse the polarity of said voltage difference.

52. A device as claimed in claim 51, further comprising a device for detecting the presence of a light signal such that the presence of said light signal produces changes in the state of said switch.

53. A device as claimed in claim 37, wherein said means for obtaining a desired orientation is an anisotropic coating applied to a surface of said dielectric means.

54. A method of forming a liquid crystal electro-optical switching device, comprising the steps of:
disposing a quantity of ferroelectric liquid crystal having a plurality of adjacently disposed molecular layers, a unit vector molecular director field $\vec{n}$, and refractive indices determined by said director field adjacent to a dielectric material so as to define a boundary therebetween;
aligning said layers in a desired orientation;
disposing means for creating electric fields in said ferroelectric liquid crystal so that changes in said electric fields will produce changes in said director field, thereby producing changes in said refractive indices; and
disposing said boundary with respect to incident light so that said changes in said refractive indices produce changes in the interaction of said light with said boundary.

55. A method in accordance with claim 54, comprising the further steps of:
disposing said ferroelectric liquid crystal within a containing means having first and second planar bounding plates;
placing electrical conducting means on said plates;
placing said plates parallel to each other so as to define a gap therebetween; and
inserting spacing means around the edges of said gap and distributed throughout said gap as to maintain said gap at a desired thickness.

56. A method in accordance with claim 55, wherein said step of placing electrical conducting means comprises the step of:
vacuum evaporating a thin layer of a conductive metal onto each of said plates.

57. A method in accordance with claim 55, wherein said step of placing electrical conducting means comprises the step of:
vacuum depositing a thin layer of a conductive metal onto each of said plates such that said thin layer is transparent.

58. A method in accordance with claim 55, wherein said step of disposing said ferroelectric liquid crystal within said containing means comprises the steps of:
heating said plates and said spacing means;
evacuating air from said gap; and
placing said ferroelectric liquid crystal at an edge of said gap such that capillary forces acting on said ferroelectric liquid crystal will cause said ferroelectric liquid crystal to flow into said gap until said gap is full.

59. A method in accordance with claim 55, wherein said step of aligning said layers comprises the step of:
applying an anisotropic coating to at least one of said plates.

60. A method in accordance with claim 55, wherein said step of aligning said layers comprises the step of:
applying a gentle shear strain to said layers by passing said plates, said spacing means and said gap containing ferroelectric liquid crystal between a plurality of rollers which are alternately offset to rotate in opposite directions, said layers being oriented parallel to the direction of motion of said plates past said rollers.

61. A method in accordance with claim 55, wherein said plates are formed of glass.

62. A method in accordance with claim 55, wherein said plates are formed by a transparent, flexible polymer.

63. A method in accordance with claim 55, wherein said step of placing electrical conducting means on said plates includes the step of:
placing first electrical conducting means on said first plate and second electrical conducting means on said second plates so that a voltage difference between said first and second conducting means produces an electric field in said ferroelectric liquid crystal that is perpendicular to said plates.

64. A method in accordance with claim 63, wherein said aligning step includes the step of:
aligning said layers at an angle respect to said plates and such that said director field is oriented more nearly parallel to that direction parallel to both the plane of incidence and the boundary when said director field is in a first orientation, and said director field is oriented less nearly parallel to that direction parallel to both the plane of incidence and the boundary when said director field is in a second orientation.

65. A method in accordance with claim 55, wherein said step of placing electrical conducting means on said plates includes the step of:
placing first and second electrical conducting means on the same plate so that a first voltage difference between said first and second conducting means produces a first electric field in said ferroelectric liquid crystal that is parallel to said plates, and a second voltage difference opposite to said first voltage difference produces a second electric field directed opposite to said first electric field.

66. A method in accordance with claim 65, wherein said aligning step includes the step of:
aligning said layers at an angle $\delta$ with respect to said plates and such that said director field is oriented more nearly perpendicular to said boundary when said first electric field is applied and more nearly parallel to said boundary when said second electric field is applied.

67. A method in accordance with claim 66, wherein $\delta = 45°$.

68. A method in accordance with claim 54, comprising the further step of:

forming said dielectric from a further quantity of ferroelectric liquid crystal having a unit vector molecular director field n such that the director fields on either side of said boundary can be controlled independently by said applied electric fields.

69. A method in accordance with claim 68, comprising the further step of:
disposing a waveguide layer adjacent said quantity of ferroelectric liquid crystal and a substrate adjacent said waveguide layer, wherein said incident light propagates through said waveguide layer, and evanescent fields of said incident light extend into said ferroelectric liquid crystal.

70. A method of creating electro-optical effects, comprising the steps of:
disposing a quantity of ferroelectric liquid crystal having a plurality of adjacently disposed molecular layers and a unit vector molecular director field adjacent to a dielectric material so as to define a boundary therebetween;
aligning said layers in a desired orientation;
applying electric fields to said ferroelectric liquid crystal, changes in said electric fields causing changes in said director field; and
applying light to said boundary such that said changes in said director field produce changes in the extent to which said light is transmitted.

71. A method in accordance with claim 70, wherein said step of applying electric fields to said ferroelectric liquid crystal comprises the steps of:
detecting a light signal; and
generating changes in said electric fields in response to changes in said light signal.

72. A method in accordance with claim 70, wherein said step of applying electric fields to said ferroelectric liquid crystal comprises the steps of:
detecting the presence of a light signal;
generating a first electric field from said light signal and no other external power; and
generating a second electric field when said signal is not detected.

73. A method in accordance with claim 70, wherein said step of applying electric fields to said ferroelectric liquid crystal comprises the steps of:
illuminating a first group of photovoltaic devices;
generating a first electric field solely from the output of said first group of devices when said first group is illuminated;
illuminating a second group of photovoltaic devices; and
generating a second electric field solely from the output of said second group of devices when said second group is illuminated.

74. A liquid crystal electro-optical switching device, comprising:
a first dielectric comprising a waveguide;
a second dielectric comprising a quantity of ferroelectric liquid crystal having a unit vector molecular director field $\vec{n}$ and refractive indices determined by said director field disposed adjacent said waveguide so as to form a cladding layer for said waveguide and a boundary between said waveguide and said cladding layer;
means for applying electric fields to said second dielectric, said electric fields having an intensity sufficient to change the direction of said director field, said director field direction change further producing a change in said refractive indices of said second dielectric; and
means for directing light via said waveguide so as to be incident on said boundary between said waveguide and said cladding layer, changes in said director field causing changes in the manner in which said incident light interacts with said boundary.

75. A device as claimed in claim 74, wherein interaction of said incident light with said boundary causes part of said incident light to be radiated out of said waveguide, and changes in the direction of said director field cause changes in the rate of said radiation.

76. A device as claimed in claim 75, wherein for a first director field orientation said interaction of said incident light with said boundary causes said incident light to be totally internally reflected within said waveguide so that said rate of radiation is zero, whereas for other director field orientations said rate of radiation is greater than zero.

77. A device as claimed in claim 75, further comprising another waveguide disposed with respect to said waveguide of said first dielectric and said liquid crystal such that light radiated from said waveguide of said first dielectric is incident on said another waveguide, said liquid crystal also cladding said another waveguide such that light incident via said waveguide of said first dielectric may be coupled into said another waveguide via said liquid crystal cladding, changes in said director field producing changes in coupling of said radiated light between said waveguides.

78. A device as claimed in claim 74, wherein said liquid crystal is comprised of a quantity of ferroelectric liquid crystal of the chiral tilted smectic phase.

79. A liquid crystal electro-optical switching device, comprising:
a first dielectric comprising a first waveguide;
a second dielectric comprising a quantity of liquid crystal having a unit vector molecular director field $\vec{n}$ and refractive indices determined by said director field disposed adjacent said first waveguide so as to form a cladding layer for said first waveguide and a boundary between said first waveguide and said cladding layer;
means for applying electric fields to said second dielectric, said electric fields having an intensity sufficient to change the direction of said director field, said director field direction change further producing a change in said refractive indices of said second dielectric;
means for directing light via said first waveguide so as to be incident on said boundary between said first waveguide and said cladding layer, interaction of said incident light with said boundary causing part of said incident light to be radiated out of said first waveguide; and
a second waveguide disposed with respect to said first waveguide of said first dielectric and said liquid crystal such that light radiated from said first waveguide of said first dielectric is incident on said second waveguide, said liquid crystal also cladding said second waveguide such that light incident via said first waveguide of said first dielectric may be coupled into said second waveguide via said liquid crystal cladding, changes in said director field producing changes in coupling of said radiated light between said first and second waveguides,
wherein said first and second waveguides are respectively comprised of first and second bounding plates disposed parallel to each other, said liquid crystal being disposed in a slab between said plates, said first plate comprising a high refractive index waveguide layer disposed adjacent said liquid crystal and a low refractive index substrate adjacent said waveguide layer, and said second plate comprising a high refractive index waveguide layer disposed adjacent said liquid crystal and a low refractive index substrate adjacent said waveguide layer.

80. A device as claimed in claim 79, wherein said electric fields are applied in directions perpendicular to said plates, a first orientation of said director field selected by said electric fields has a director field orientation more nearly parallel to both the plane of incidence of said incident light and the boundary, and a second orientation of said director field selected by said electric fields having a director field orientation less nearly parallel to both the plane of incidence of said incident light and the boundary.

81. A device as claimed in claim 79, wherein said electric fields are applied in a direction parallel to said plates, said slab having molecular layers tilted at an angle $\delta$ ($0<\delta<90°$) with respect to a perpendicular to said plates, said director field being oriented in a first orientation more nearly perpendicular to said plates by a first electric field, and in another orientation more nearly parallel to said plates by a second electric field directed opposite to said first electric field.

82. A device as claimed in claim 79, wherein each of said waveguides is further divided into a plurality of waveguide channels, each of said channels on said first plate overlapping each of said channels on said second plate, said means for applying electric fields further allowing said electric fields to be selectively applied at overlap locations of said channels such that light incident in any of said channels of one of said waveguides can be coupled to selected of said channels of the other waveguide.

* * * * *